RECORD CHANGER

Filed Oct. 8, 1964 10 Sheets-Sheet 1

INVENTORS:
Martin C. Reed
William R. Baillie
Bert L. Altmann
By Hofgren, Wegner,
Allen, Stellman & McCord Attys July 30, 1968 M. C. REED ETAL 3,394,938

RECORD CHANGER

Filed Oct. 8, 1964 10 Sheets-Sheet 2

July 30, 1968 M. C. REED ETAL 3,394,938

RECORD CHANGER

Filed Oct. 8, 1964 10 Sheets-Sheet 6

United States Patent Office 3,394,938
Patented July 30, 1968

3,394,938
RECORD CHANGER
Martin C. Reed and William R. Baillie, Roselle, and Bert L. Altmann, Chicago, Ill., assignors to Warwick Electronics Inc., a corporation of Delaware
Filed Oct. 8, 1964, Ser. No. 402,462
32 Claims. (Cl. 274—10)

ABSTRACT OF THE DISCLOSURE

A record player for automatically playing records of different size, and including a last record shut off mechanism that is actuated in response to the latching of a movable record size sensing member in a clearance position by a record stack stabilizing pressure arm. A bifurcated dog actuator is releasably clutched to a tone arm set down cam for moving the tone arm during a record change cycle; and a movable set down lever, the position of which is controlled by the size sensing member, is engageable with the set down cam to control the set down position of the tone arm in accordance with the size of an ejected record.

This invention relates in general to record changers, and more particularly to an improved record changer for automatically playing a plurality of records of different size.

In the past, it has been well known to provide automatic record changers with means whereby the changers are capable of playing records of different size. Known devices have proven less than completely satisfactory because of the relatively complex mechanisms which have been used to effect the desired results. Such known devices are characterized by the use of a large number of component elements, which renders the devices difficult to assemble, and troublesome in use. Also, because of the complex mechanisms which have been employed in the past, the cost of these units has been prohibitive. Accordingly, the general purpose of the present invention is to provide a simplified automatic record changer which is relatively inexpensive to manufacture, and which materially reduces the number of component elements so as to minimize and simplify whatever maintenance may be necessary. In order to achieve this result, the present invention simplifies and improves several of the record changer mechanisms which cooperate to produce the desired results.

An object of the invention is to provide an automatic record changer with improved means for sensing the size of records to be played, and improved means for positioning the record changer tone arm in accordance with the size record that has been sensed.

Another object of the invention is the provision of improved means for driving the tone arm of an automatic record changer, as described above, to an out-of-the-way position adjacent the turntable when the lowermost record in a record stack is being ejected, and for driving the tone arm to an appropriate set down position for the size of record which has been ejected.

A further object of the invention is to provide an automatic record changer, as described above, with improved means for shutting off the record changer after the last record in the record stack has been played.

Still another object of the invention is to provide an automatic record changer with a main actuating member which is movable between a plurality of positions for controlling different record changer functions, and with novel means for returning the main actuating member to a neutral position.

A still further object of the invention is to provide an automatic record changer with novel means for controlling the on-off operation of the changer, and for controlling a record reject mechanism.

Another object of the invention is to provide an automatic record changer with improved means for controlling the lowering of ejected records to the turntable.

Still another object of the invention is to provide an automatic record changer with novel velocity trip means for initiating a record change cycle.

Still another object of the invention is to provide a record changer for playing a plurality of records of different size with novel means for supporting the record size sensing member.

A still further object of the invention is to provide an automatic record changer with means for shifting a turntable rotating member out of engagement with a motor driven member during periods when the record changer is not in use.

These and other objects of the invention will hereinafter become more apparent from the following description taken in connection with the annexed drawings, wherein.

Figure 1:
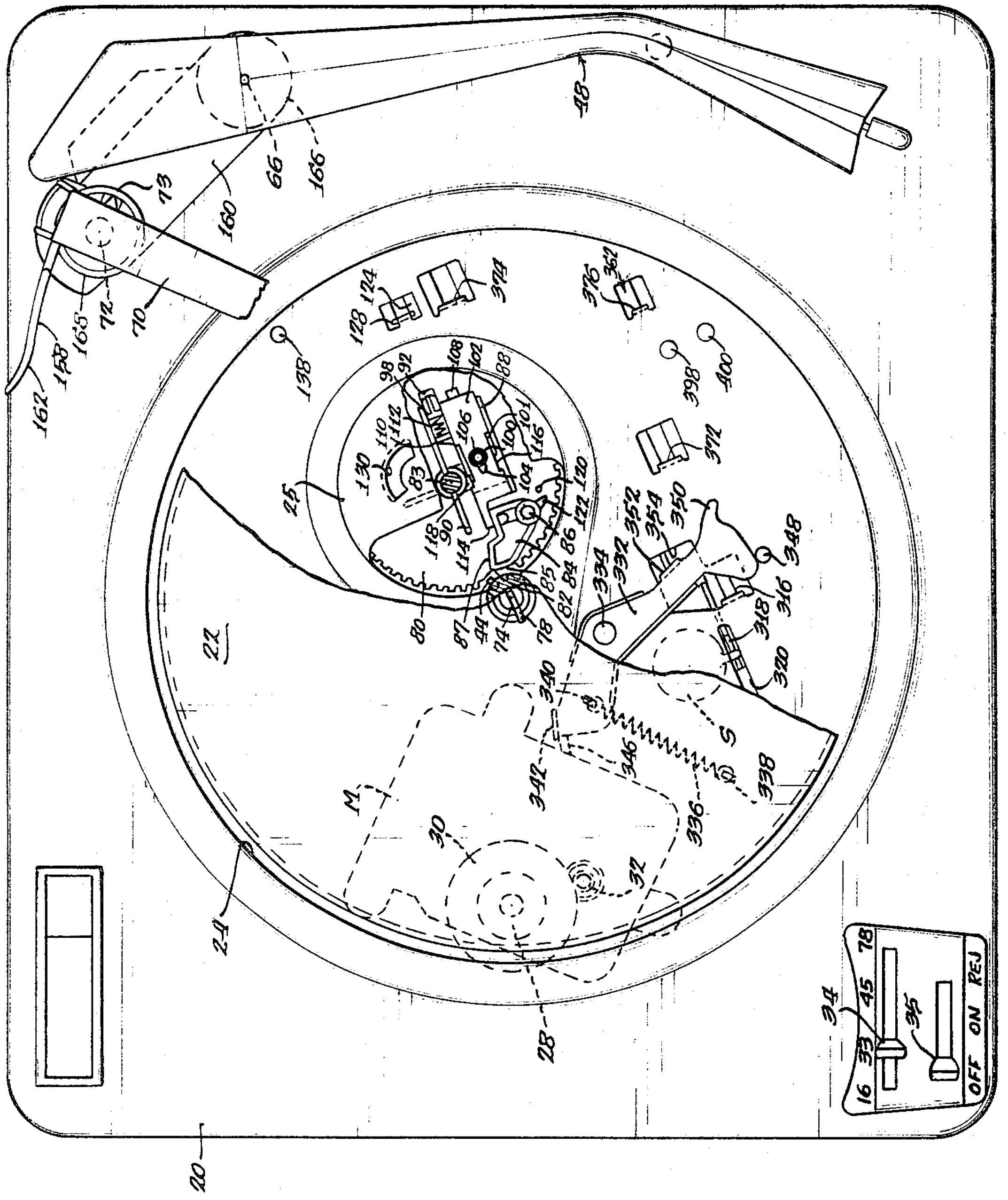
FIG. 1 is a top plan view of a preferred embodiment of the invention, with certain parts broken away for clarity of illustration, and with certain parts being shown in diagrammatic form.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The illustrated record changer embodiment includes a generally rectangular motor board 20 having a central well 24, in which a turntable 22 is rotatably mounted. The upper surface of the turntable 22 is preferably provided with a cushioning mat 26, for engaging the undersurface of a record supported thereon. As can be best seen in FIGS. 5 and 6, turntable 22 includes a depending annular flange 23 at the periphery thereof, which is adapted to be drivingly engaged by an idler wheel 28 (FIG. 1), as is well known in the art. As is conventional, a large diameter wheel 30 is mounted coaxially with idler 28, and is adapted to be moved into engagement with the portions of different diameter on a multidiameter sleeve member 32 fixed on the output shaft of a drive motor M, as the speed selection lever 34 is operated.

Figures 4, 5:
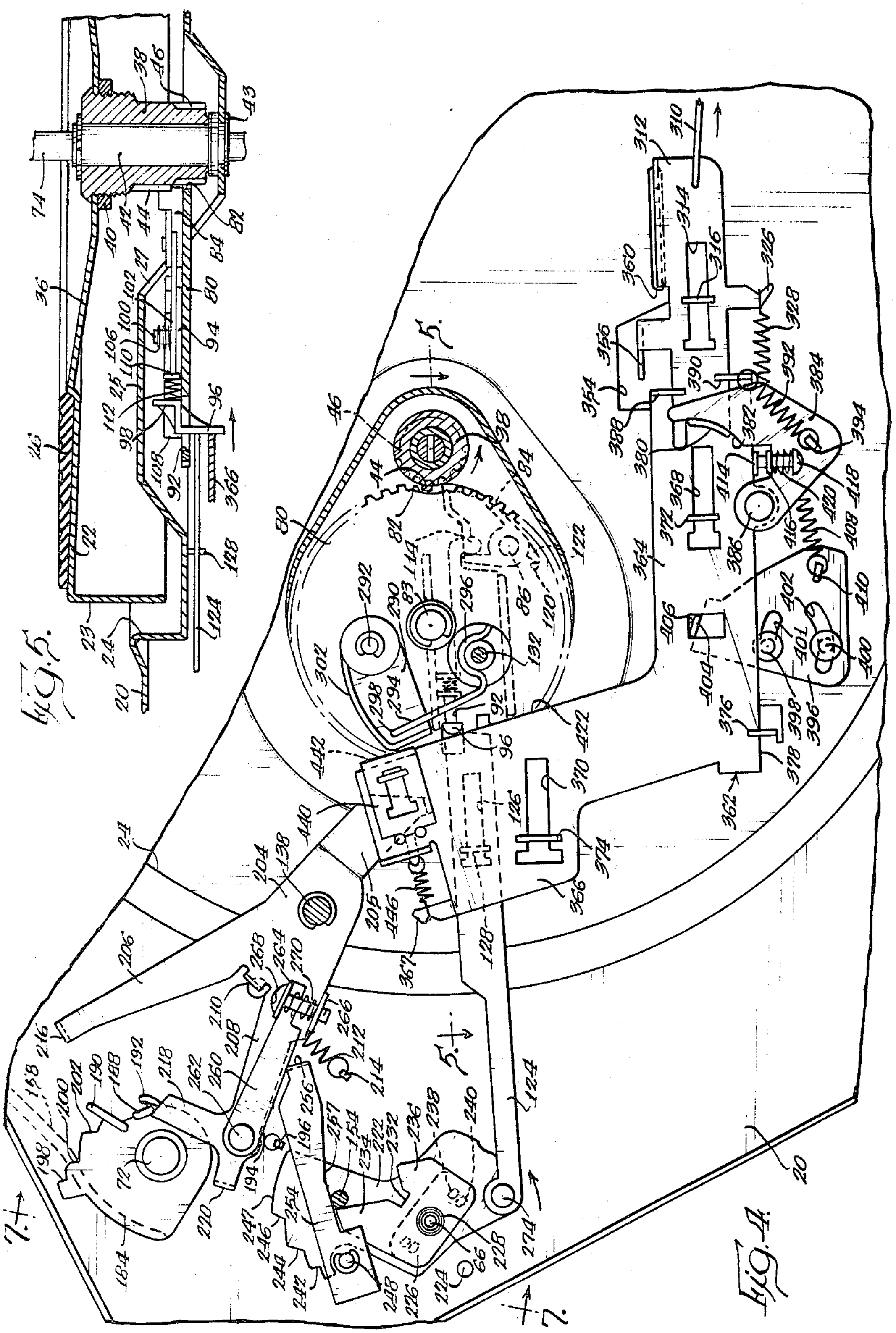
FIG. 4 is an enlarged fragmentary bottom plan view showing the position of the operating elements at the start of a record change cycle, with certain parts being shown in section.
FIG. 5 is a sectional view taken generally along line 5—5 of FIG. 4, with certain parts broken away for clarity of illustration.
Figure 6:
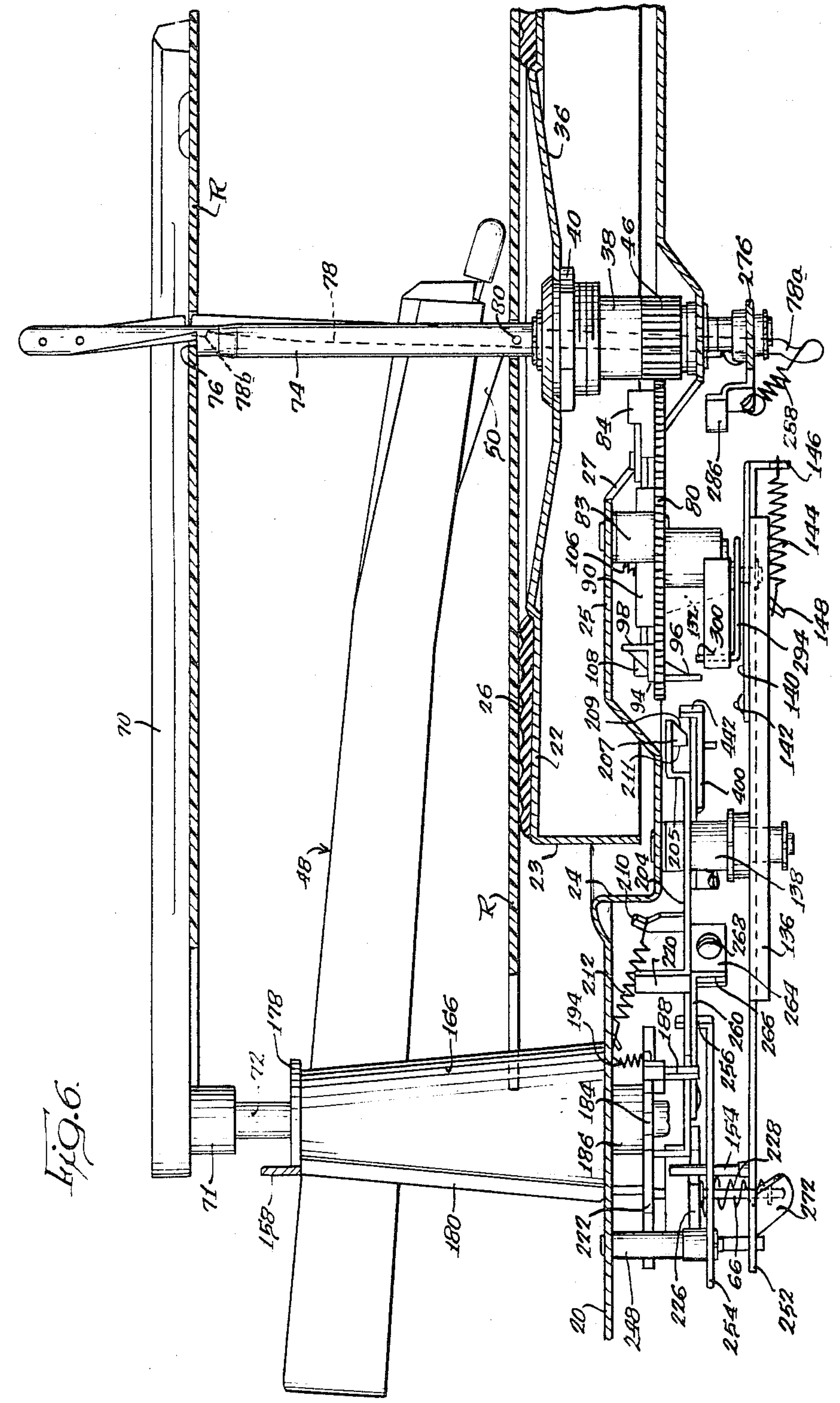
FIG. 6 is an enlarged sectional view taken generally along line 6—6 of FIG. 2, but showing the tone arm in the playing position.

The central portion of turntable 22 is dished as seen at 36 in FIGS. 5 and 6, and includes a central hole in which a hub 38 is held by nut 40. The lower portion 43 of a spindle bushing 42 is fixed on motor board 20, and the bushing 42 extends through the central hole in hub 38. A longitudinally extending lug 44 is provided on one side of hub 38 for effecting the start of a record change cycle, as will hereinafter be more fully explained. A plurality of longitudinally extending teeth 46 are provided on the lower portion of hub 38 for driving a drive gear to be also hereinafter explained in detail.

The illustrated record changer embodiment includes a tone arm 48, which is provided with a conventional cartridge and stylus assembly 50 for tracking the spiral groove of a record R. A vertically extending tone arm shaft 52 (FIGS. 7 and 9) is mounted for pivotal movement on motor board 20, and includes a pivot bracket 54 secured to the upper end thereof. Bracket 54 is preferably rotatably mounted on shaft 52 for adjustment purposes, and means (not shown) such as a set screw are provided to fix bracket 54 to shaft 52 during use. Bracket 54 is bifurcated, and includes upwardly extending apertured ears 56 and 58 at opposite sides thereof. Tone arm 48 is generally U-shaped in cross section, and includes a central portion 60, and downwardly extending sides 62 and 64 at opposite edges of portion 60 which embrace the ears 56 and 58 of bracket 54. Suitable apertures are provided in sides 62 and 64, and are aligned with the apertures in ears 56 and 58, and a pivot pin, not shown, impales each of the aligned apertures to mount tone arm 48 for pivotal movement about a horizontal axis. A tone arm lift pin 66 is slidably mounted in a central bore in tone arm shaft 52, and the upper portion 66*a* of pin 66 is engageable with an adjustable abutment 68 carried by the central portion 60 of tone arm 48, to effect the pivoting movement of tone arm 48 about the horizontal axis.

A pressure arm 70 is fixed to the upper end of a generally vertically extending pressure arm shaft 72, which is mounted for pivotal movement with respect to motor board 20 by means to be hereafter described in detail. As can be best seen in FIG. 6, pressure arm 70 is adapted to overlie a stack of records to stabilize the same on a record changer spindle.

A spindle 74 is provided centrally of turntable 22, and bushing 42 mounts turntable 22 for rotation relative to the spindle. Spindle 74 includes a horizontal shelf 76 between the ends thereof, which is spaced a substantial distance above the upper surface of turntable 20, for supporting a stack of records, as can be best seen in FIG. 6. As is known in the art, spindle 74 is formed of a generally hollow or slotted construction, and includes a longitudinally extending ejector lever 78 which is pivotally mounted to the spindle 74 as at 80 in FIG. 6. The upper portion of ejector lever 78 is enlarged as at 78*b*, and engages the central hole of the lowermost record in a record stack to eject the same from shelf 76 for movement toward the turntable when ejector lever 78 is pivoted about pin 80.

As can be best seen in FIGS. 5 and 6, the bottom surface of the well portion 24 of motor board 20 is provided with an upraised portion 25 having a lateral opening 27 which faces hub 38. A drive gear 80 is provided with a central hub 83 which is rotatably mounted on motor board portion 25, and gear 80 extends outwardly through opening 27 so as to position the teeth thereon in position for meshing engagement with the teeth 46 on hub 38. Gear 80 includes a portion 82 in which no teeth are provided, and as will hereinafter become more fully apparent, gear portion 82 is positioned adjacent hub 38 during the playing of a record, so that the gear 80 does not rotate. When the end of a record is reached or when a reject lever to be hereafter described is actuated, a trip mechanism to be also hereafter described engages lug 44 on hub 38 to move the teeth on gear 80 into meshing engagement with teeth 46, whereby a record change cycle is effected.

As may be best seen in FIG. 1, the trip mechanism includes a trip pawl 84 which is pivotally mounted on the upper surface of gear 80 at 86. Pawl 84 includes a forward cam surface 85, and a detent surface 87 disposed at substantially right angles thereto, for a purpose to be hereafter described. A pair of spaced parallel ribs 88 and 90 are provided on the upper surface of gear 80, and define therebetween a horizontal slideway. A slot 92 is provided in gear 80 between ribs 88 and 90, and extends substantially parallel thereto (FIGS. 1 and 5). The trip mechanism includes a lower actuating plate 94 slidably mounted between ribs 88 and 90. Plate 94 includes a tab 96 extending downwardly through slot 92, and upwardly extending tab 98, and an upwardly extending post 100. An upper plate 102 is mounted on lower plate 94, and is provided with a slot 104 which receives post 100 therethrough. A light spring 106 is biased between a suitable retaining member on post 100 and the upper surface of plate 102, to frictionally clutch plates 94 and 102 for movement together. An upright stop 108 is provided on gear 80 to limit the movement of plate 102 to the right as viewed in FIG. 1. A tab 110 extends transversely outwardly from one side of plate 102, and carries suitable means for mounting a compression spring 112 which is positioned for engagement with tab 98 on lower plate 94 when the lower plate 94 moves relative to the upper plate 102. The forward end of plate 102 includes a hook 114 which is received in a suitable transverse opening in pawl 84. Thus, when upper plate 102 is moved to the left as viewed in FIG. 1, the engagement of portion 114 with pawl 84 will cause the pawl to pivot in a counterclockwise direction about pivot 86 into position for engagement with lug 44 on hub 38. Suitable inwardly directed guide members 116 and 118 are provided on ribs 88 and hub 82 respectively, to guide plate member 102 in its longitudinal movement and to prevent plates 94 and 102 from being disengaged from the upper surface of gear 80. In this respect it should be noted that longitudinal notches 101 are provided on opposite sides of plate 102 (similar notches, not shown, are also provided on plate 94). The width of the plates between the notches are less than the distance between guides 116 and 118, so that the plates 94 and 102 may be assembled on the gear 80 without difficulty by placing them on the gear 80 with the notches aligned with the guides 116 and 118. The plates 94 and 102 are then moved relative to the guides 116 and 118 so that the guides are disposed over the wider plate portions adjacent the notches to retain the plates on gear 80. When the hooked portion 114 of plate 102 is inserted into the transverse opening in pawl 84, the plates are positively held on the gear 80. A pin 120 extends upwardly from the upper surface of gear 80, and is positioned for engagement with an ear 122 on pawl 84, to provide a stop to limit the ultimate movement of pawl 84. In order to provide a substantially friction-free operation of the trip mechanism, the drive gear 80, pawl 84, and plates 94 and 96 are formed of a suitable plastic material, such as that available from the E. I. du Pont de Nemours and Company under the trademark DELRIN.

The means for moving pawl actuating plate 102 to effect a record change cycle during the automatic playing of a stack of records include a longitudinally extending lever 124 (FIG. 4), which is mounted for longitudinal movement relative to the motor board 20, by the engagement of a generally T-shaped tab 128 on the motor board with a longitudinal slot 126 in the lever. Lever 124 is moved to the right as viewed in FIG. 4 as the tone arm 48 moves across a spiral groove of a record, by means to be hereafter described. When the end of a record is reached, the movement of lever 124 will be accelerated due to the engagement of the stylus carried by the tone arm with the more widely spaced spiral lead out groove at the end of a record. The right hand end of lever 124, as viewed in FIG. 4, will then move into engagement with the downwardly extending tab 96 on lower actuating plate 94, and plates 94 and 102 will be moved to the right because of the clutching action of spring 106. This movement will shift pawl 84 into position for engagement with lug 44. Additional movement of lever 124 to the right as the stylus reaches the end of the record groove, will be taken up by the movement of the lower plate 94 relative to the upper plate 102 until the post 100 reaches the end of slot 104. At this point, the pawl 84 will be resiliently mounted with respect to the operating lever 124, because of the compression of spring 112 between tabs 98 and 110. Depending upon the amount of recorded material on the record being played, and the location of the records' lead out groove, the end of lever 124 may engage tab 96 prior to the entry of the stylus into the lead out groove. In such a situation the plates 94 and 102 (and pawl 84) will be moved slowly toward the hub 38 as the record rotates. Eventually the leading surface 85 of pawl 84 may be moved into the path of travel of lug 44, and pawl 84 will be pivoted in a clockwise direction as viewed in FIG. 1 to move plate 102 relative to plate 94. However, as the record continues to rotate and lever 124 moves plate 94, plate 102 will move with plate 94 under the clutching action of spring 106 until pawl surface 85 again moves into engagement with lug 44. The sequence will be repeated until the record tracking stylus enters the record lead out groove whereupon the movement of lever 124 will be accelerated, and the detent portion 87 of pawl 84 will be moved into position for engagement with lug 44 to initiate a record change cycle.

As gear 80 begins to rotate because of the engagement of its teeth with the teeth 46 on hub 38, the upwardly extending tab 98 on lower actuating plate 94 will be moved into engagement with an arcuate reset cam 130 (FIG. 1) extending downwardly from motor board portion 25, which will move the operating plates 94 and 102 to the left as viewed in FIGS. 5 and 6, until upper plate 102 engages stop 108, and lower plate 94 moves to the left with respect to the upper plate 102 to reset the clutch defined by spring 106. At this point, the elements of the trip actuating mechanism will be in position for starting another record change cycle. Gear 80, pawl 84, and plates 94 and 102 are preferably formed of a suitable plastic material having a low coefficient of friction such as the plastic available from E. I. du Pont de Nemours under the trademark DELRIN.

When the record change cycle is initiated by manual operation of the reject lever to be hereafter described, there is a possibility that the cam surface 85 of pawl 84 will be moved into engagement with the end of the rotating lug 44, and that a record change cycle will not be initiated. Spring 112 obviates this problem, since it will be compressed when the reject lever moves the pawl 84 into engagement with the lug 44. Thus, as soon as the lug 44 rotates past pawl 84, spring 112 will force the detent portion 87 of the pawl into position for engagement with the lug 44, and the record change cycle will be initiated upon the next revolution of lug 44.

An eccentric pin 132 extends downwardly from drive gear 80, and is received in a suitable arcuate slot 134 (FIGS. 2, 8 and 15) in a rocker arm 136. Rocker arm 136 is mounted for pivotal movement with respect to the motor board 20 by a pivot pin or shaft 138. A detent lever 140 is pivotally mounted on the upper surface of rocker arm 136 by a suitable pin 142, and a spring 144 is connected between the downwardly extending forward end 146 of lever 140, and a tab 148 on one side of rocker arm 136, to bias rocker arm 136 into engagement with pin 132. The end portion 146 of detent lever 140 is movable between edges 150 and 152 provided on the end of rocker arm 136, as rocker arm 136 is pivoted on pivot 138 by movement of pin 132. Detent lever 140 is somewhat V-shaped in plan view (FIG. 15), and includes cam surfaces 141 and 143 on the divergent legs thereof which merge into a notched cam portion 145 that defines a starting position or detent position, as will hereafter appear.

Figures 2, 3:
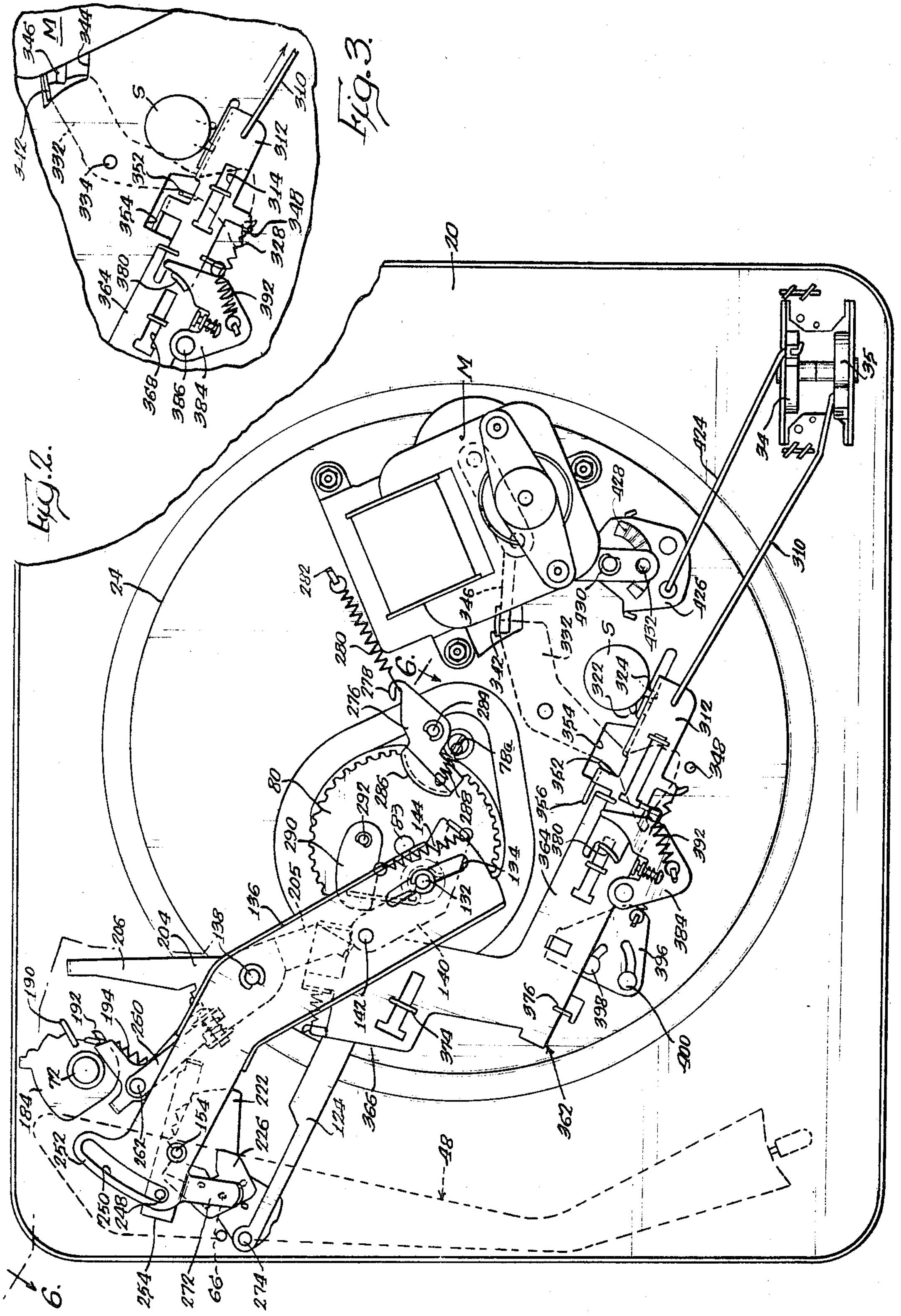
FIG. 2 is a fragmentary bottom plan view of the record changer illustrated in FIG. 1 with the on-off switch being shown in the off position, with the tone arm being in an "out" position, and with the other elements of the record changer being shown in the play position.
FIG. 3 is a fragmentary bottom plan view of the on-off switch operating mechanism, showing the parts in the switch-on position.
Figure 8:
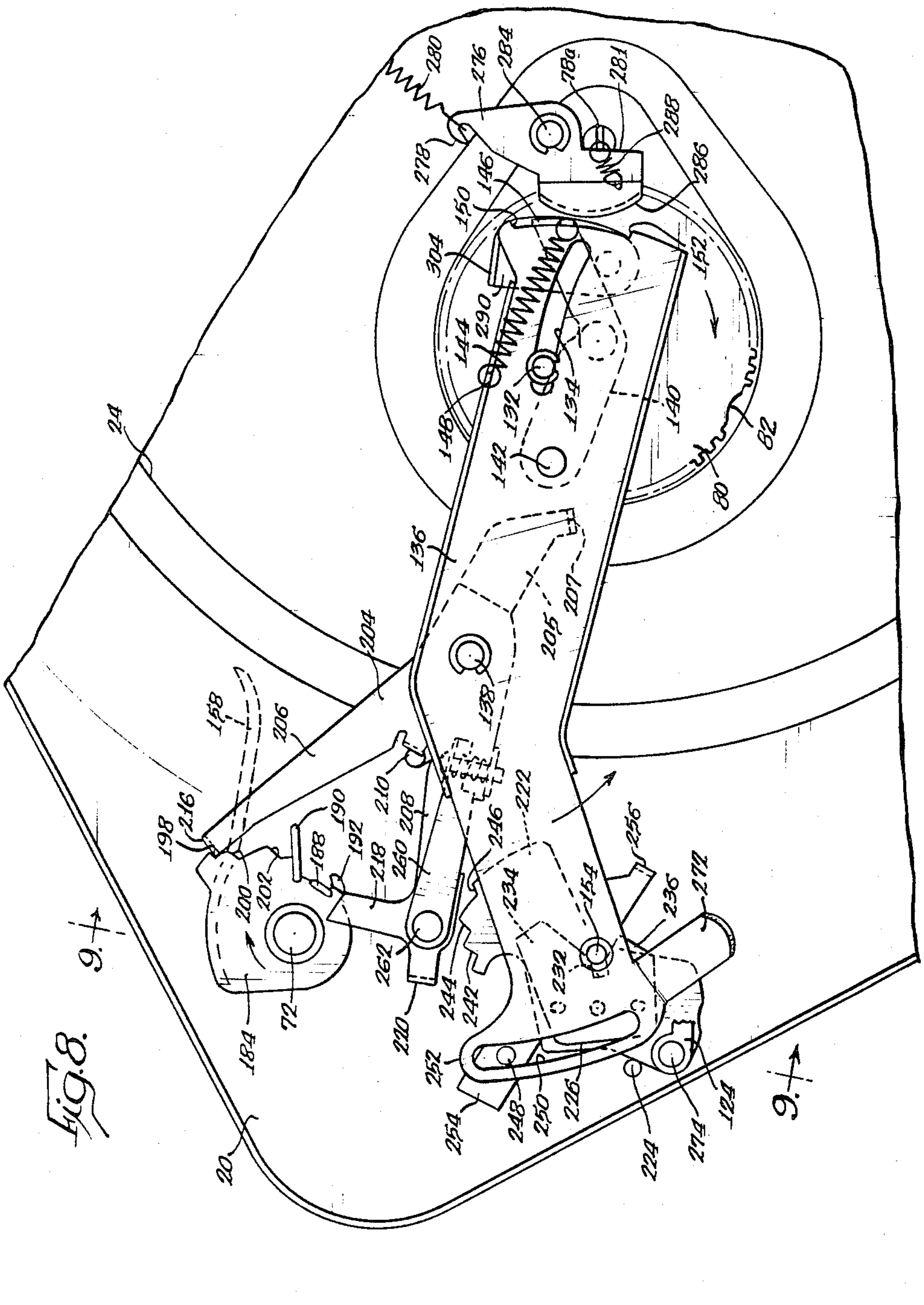
FIG. 8 is an enlarged fragmentary bottom plan view, with certain parts broken away for clarity of illustration; and showing the operating mechanism for the record changer with the tone arm in an "out" position, and prior to the dropping of a record.
Figures 15, 16:
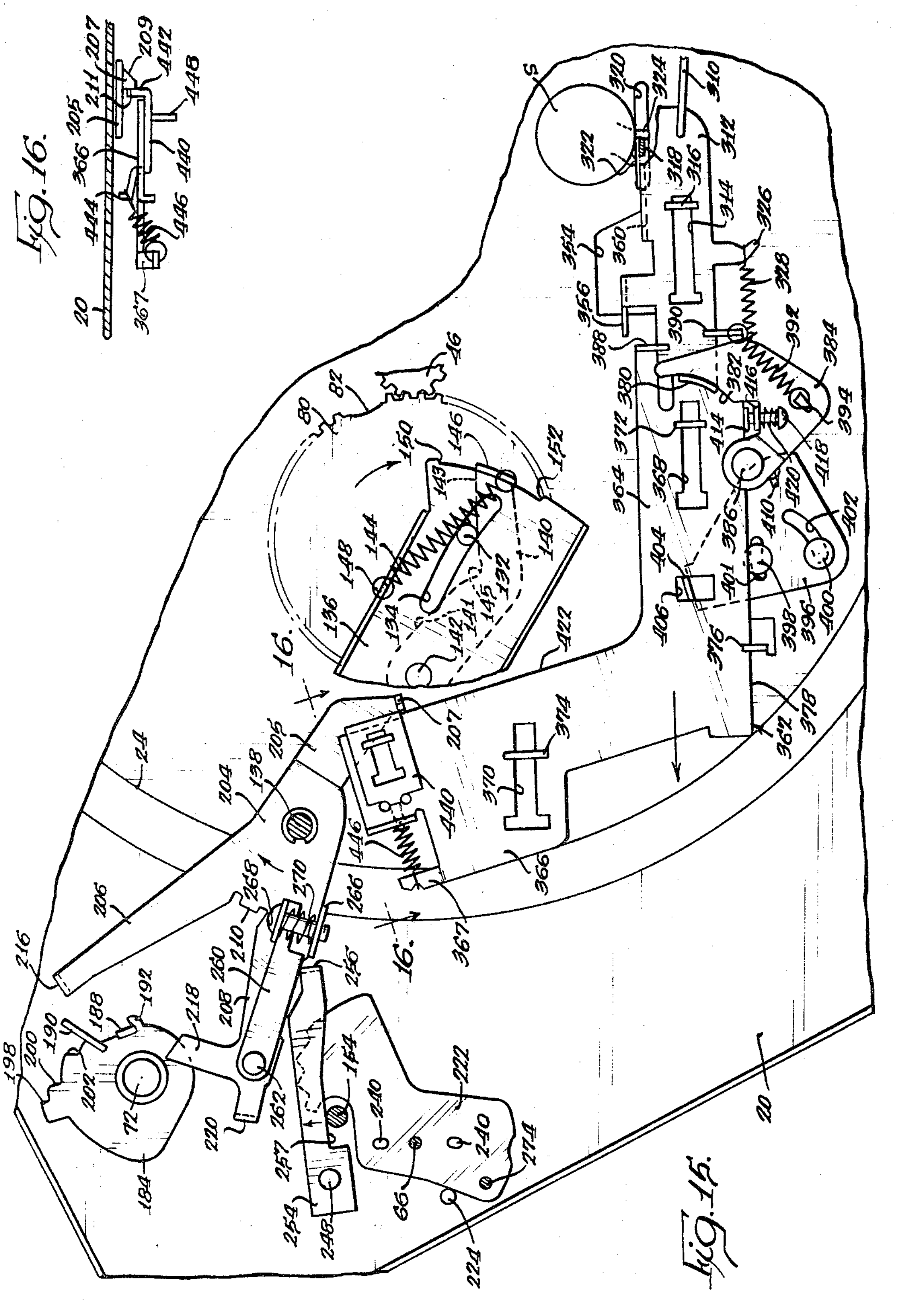
FIG. 15 is a fragmentary view similar to FIG. 11, showing the operating elements at the end of a record change cycle and illustrating the means for last record shut-off.
FIG. 16 is a sectional view taken generally along line 16—16 of FIG. 15.

Prior to the start of a record change cycle, the parts are positioned as shown in FIG. 2, with a spring 144 holding pin 132 in notch 145, and with the end portion 146 of lever 140 near stop 150. When the aforedescribed trip mechanism has been actuated, and gear 80 begins to rotate in a clockwise direction as viewed in FIGS. 2 and 8, pin 132 will move generally upwardly and to the left as viewed in FIGS. 2 and 8 along slot 134 and cam surface 141 to pivot rocker arm 136 in a counterclockwise direction about shaft 138. As gear 80 continues to rotate, and pin 132 approaches the end of slot 134, as shown in FIG. 8, the end portion 146 of lever 140 will be spaced from edge 150. As gear 80 continues to rotate from the position shown in FIG. 8, pin 132 will move generally upwardly and to the right as viewed in FIG. 8 to continue to pivot rocker arm 136 in a counterclockwise direction. After approximately 180 degrees of rotation of gear 80, pin 132 will be positioned approximately midway along slot 134, and the end portion 146 of detent lever 140 will be positioned adjacent edge 150. As gear 80 continues to rotate from this position, pin 132 will move generally downwardly and to the right along slot 134 and cam surface 143, and pivot rocker arm 136 in a clockwise direction as the end portion 146 of detent lever 140 moves toward edge 152. As gear 80 approaches the completion of one rotation, as is seen in FIG. 15, pin 132 moves generally upwardly and to the left along slot 134 and cam surface 143, to continue the clockwise rotation of rocker arm 136, until the pin 132 engages detent portion 145 of detent lever 140 to position the end portion 146 of the detent lever adjacent edge 150 at the end of the cycle.

During automatic operation of the record changer, when the playing of one record has been completed, it is necessary to move the tone arm 48 from a position adjacent the spindle, to an out-of-the-way position, so that the lowermost record in the stack of records supported on the spindle may be lowered to the turntable. In order to accomplish this, an upwardly extending tone arm actuating pin 154 is provided on rocker arm 136, and the pivotal movement of rocker arm 136 is used to actuate a mechanism to be hereafter described to effect the desired movement of tone arm 48. As will hereinafter become more fully apparent, means are also provided which are responsive to the pivotal movement of rocker arm 136 to effect the ejection of the lowermost record from the spindle shelf. After the lowermost record in the record stack has been ejected, it is necessary to provide means for positioning the tone arm at varying positions, depending upon the size of the record which has been ejected. Accordingly, a selector lever 158 is provided, and is movable between a position disposed over the turntable for sensing the size of an ejected record (FIG. 9) and to an inactive position disposed at the side of the turntable (FIG. 7).

Figures 12, 13, 17:
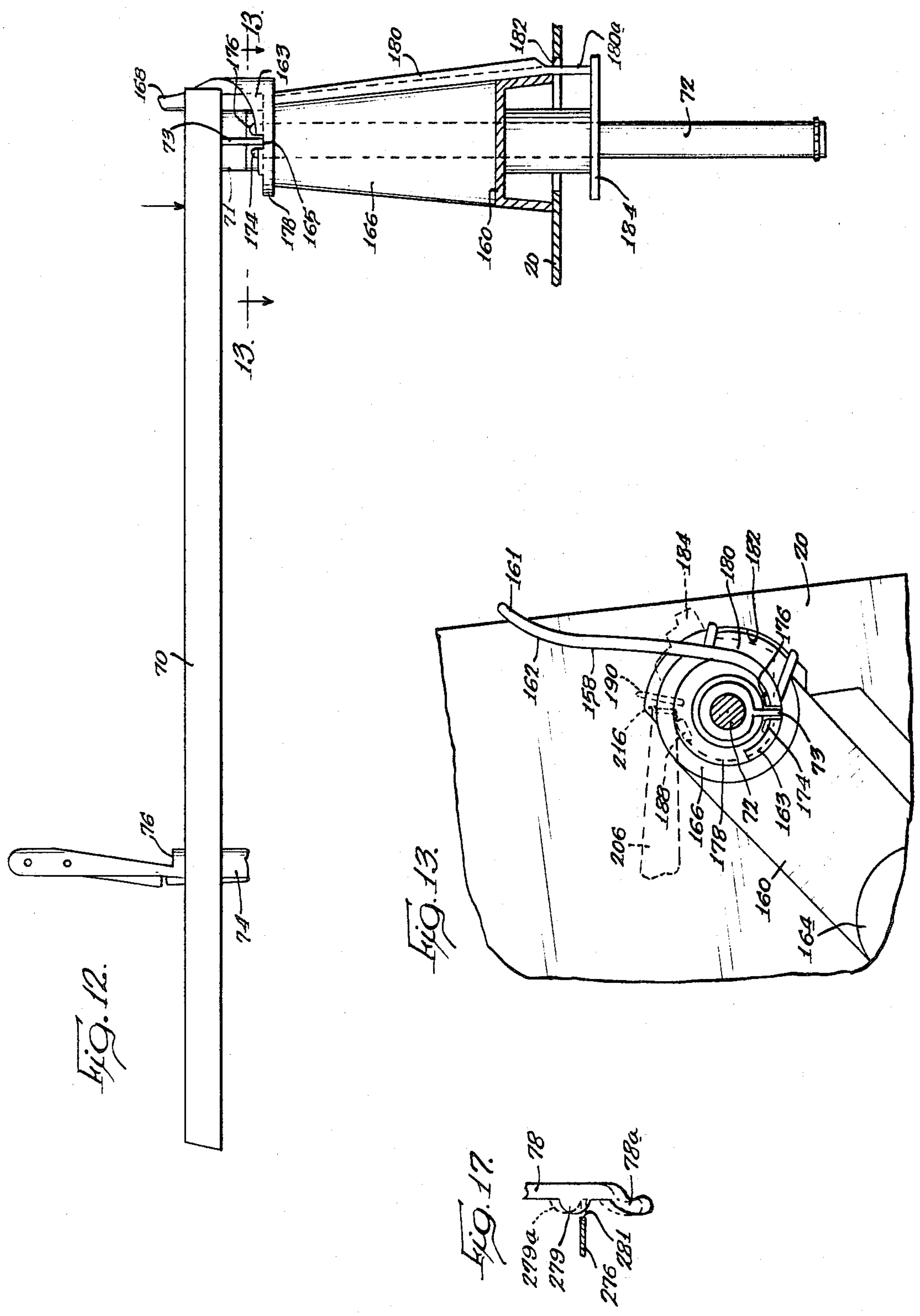
FIG. 12 is a sectional view taken generally along line 12—12 of FIG. 7.
FIG. 13 is a sectional view taken generally along line 13—13 of FIG. 12.
FIG. 17 is a side elevational view showing the spindle ejector lever and push-off lever.

Housing means are provided for supporting selector lever 158, and for supporting tone arm shaft 52 and pressure arm shaft 72. The housing means include a central web portion 160 fixed to the motor board 20 as by screws 162. A pair of upright sleeves 164 and 166 are provided at opposite ends of web portion 160. Uprights 164 and 166 are provided with respective central bores 168 and 170, which respectively mount tone arm shaft 52 and pressure arm shaft 72 for pivotal movement relative to the motor board. As may be best seen in FIG. 9, pressure arm shaft 72 is also free to move vertically within bore 170. Uprights 164 and 166 are each generally frustoconical in shape, and the upper surface of upright 166 is provided with a peripheral portion of reduced height 172. A pair of spaced upright ears 174 and 176 (FIGS. 12 and 13) are provided on the upper surface of upright 166 adjacent portion 172 and define therebetween an upwardly open notch. As may be best seen in FIG. 13, selector lever 158 is substantially J-shaped in plan view, with the rearward hooked portion of the lever being substantially concentric with upright 166. The upper surface 159 of selector lever 158 is downwardly sloped, so that records will slide along the lever without difficulty. The outer end of selector lever 158 is bent outwardly as at 161, so as to present an arcuate face 162 toward the turntable. The rearward hooked portion of lever 158 rises from an annular ring 178 which is seated within reduced portion 172 of the upright 166, and defines an upwardly extending flange 163. A slot 165 is provided in flange 163, and is movable into alignment with the slot formed between ears 174 and 176 for a purpose to be hereafter described. A leg 180 extends downwardly from lever 158, and slidably embraces the side of upright 166. The lower portion 180*a* of leg 180 extends downwardly through an appropriate arcuate slot 182 (FIGS. 9 and 12) in motor board 20. A selector cam 184 is provided at the lower end of arm 180, and is pivotally mounted on the lower end of a hollow sleeve 186 which extends downwardly from upright 166, and which provides bore 170 for the pressure arm shaft 72.

Figures 7, 9:
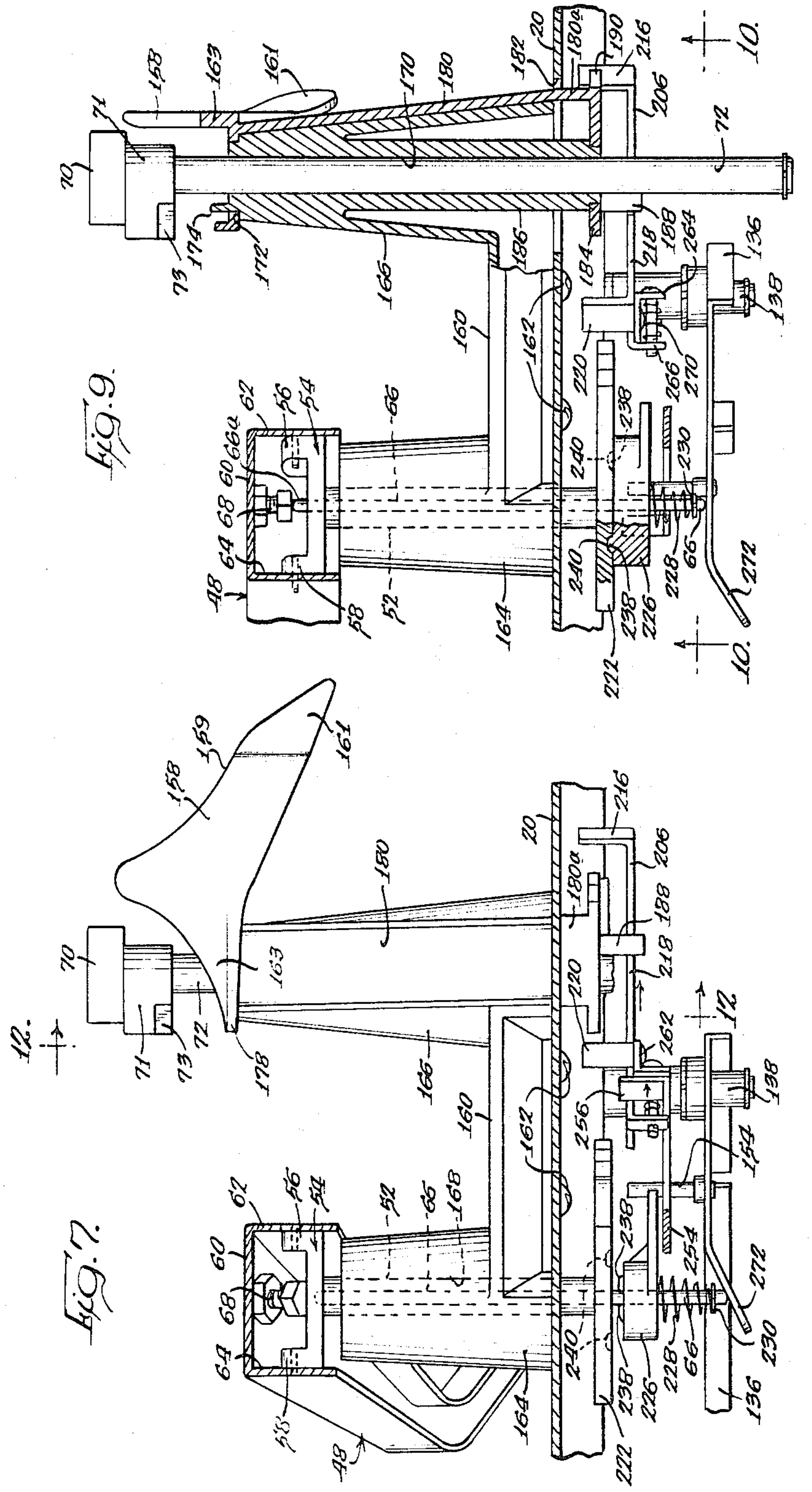
FIG. 7 is a sectional view taken generally along line 7—7 of FIG. 4.
FIG. 9 is a sectional view taken generally along line 9—9 of FIG. 8.

From a consideration of FIG. 9 it is apparent that uprights 164 and 166, and web 160 are formed from a single piece of material. It is also apparent that selector lever 158, arm 180 and cam 184 are formed from a separate single piece of material. The aforementioned housing components are each preferably formed of a smooth, plastic material having a low coefficient of friction, such as the plastic available from E. I. du Pont de Nemours and Company under the trademark Delrin. Thus, the bearing surface about which ring 178 and cam 184 rotate may be conveniently molded integrally with upright 166. Plastics such as Delrin have an inherent amount of resilience, so that the housing components may be conveniently assembled by spreading ring 178 and cam 174 relative to one another, and allowing them to "snap" into place on their respective bearing surfaces on upright 166.

Selector lever 158 is sized so that when it is positioned toward the turntable, it is not engaged by a 7-inch record. A 10-inch record will engage the selector lever 158 and rotate it a given predetermined amount, while a 12-inch record will engage the selector lever and rotate it a greater amount. A downwardly extending arm 188, and a generally radially outwardly extending arm 190 are provided on selector cam 184 for a purpose to be hereinafter described. A radial tab 192 is provided on selector cam 184, and one end of a spring 194 is hooked thereover. The other end of spring 194 is anchored to a tab 196 extending downwardly from the motor board 20 as can be seen in FIG. 4. Thus, spring 194 biases selector cam 184 in a clockwise direction as viewed from the bottom of the record changer, and selector lever 158 is urged toward a position facing the turntable.

Selector cam 184 is provided with a plurality of stops 198, 200 and 202, each positioned at different radial distances from the pivotal axis of the cam. Stop 198 is positioned the greatest radial amount from the pivotal axis of the cam and corresponds to a 7-inch size record, while stop 200 is positioned at a somewhat lesser radial distance from the pivotal axis of the cam and corresponds to a 10-inch record, and stop 202 is positioned closest to the rotational axis of the cam and corresponds to a 12-inch record. Means are provided which are responsive to the selector lever 158 sensing the size of the ejected record for controlling the positioning of the tone arm 48, and includes a set-down lever 204 which is pivotally mounted upon shaft 138.

As viewed from the bottom of the record changer, the left-hand end of set-down lever 204 is bifurcated and generally V-shaped, and includes diverging legs 206 and 208. The crotch between legs 206 and 208 is provided with a tab 210 over which one end of a spring 212 is hooked. The other end of spring 212 is anchored to a tab 214 on the motor board 20, and thus set-down lever 204 is biased in a counterclockwise direction as viewed from the bottom of the record changer. The outer end 216 of leg 206 extends upwardly into position for engagement with stops 198, 200 and 202, depending upon the particular size of the record which has been ejected from the spindle. The engagement of portion 216 of leg 206 with the appropriate stop on the selector cam 184 locates the leg 208 of the set-down lever 204 in a position for controlling the tone arm actuating mechanism which moves the tone arm into position for playing a record. Leg 208 of set-down lever 204 is provided with a generally right angularly disposed portion 218 which is positioned for engagement with tab 188 on selector cam 184 for holding the selector lever 158 in an "out" position during playing of a record. The end portion of leg 208 is provided with an upwardly extending portion 220, which is positioned for engagement with one of a plurality of stops provided on a tone arm set-down cam 222 to be hereafter described.

Figure 10:
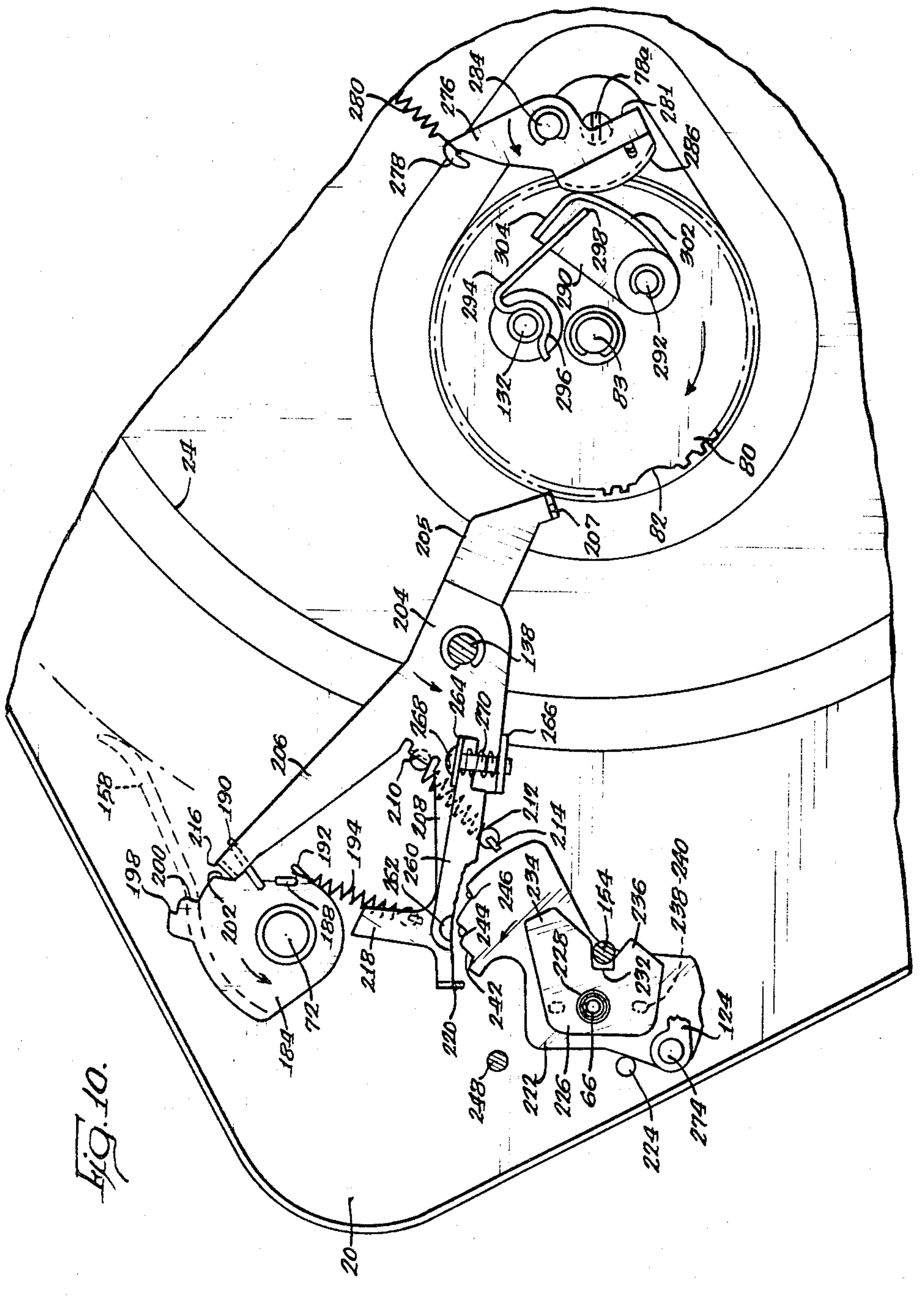
FIG. 10 is a fragmentary view taken generally along line 10—10 in FIG. 9, showing the operating elements in position for use with a 12-inch record.

Tone arm set-down cam 222 is fixedly associated with tone arm shaft 52 for pivotal movement therewith. Pivotal movement of cam 222 in a clockwise direction, as viewed from the bottom of the record changer, is limited by engagement of the rearward face of the cam with a stop 224, which depends downwardly from upright 164 and extends below the undersurface of the motor board 20. As can be best seen in FIG. 2, when cam 222 is engaging stop 224, the tone arm 48 is positioned in an "out" position spaced from the turntable 22. The means for moving the tone arm 48 to the "out" position during a record changing cycle when a record is being ejected from the spindle and lowered to the turntable includes a tone arm actuator in the form of a bifurcated dog 226 pivotally mounted on tone arm actuating pin 66. As can be best seen in FIG. 7, during normal playing of a record, tone arm actuator 226 is spaced from tone arm set-down cam 222, and a spring 228 surrounds pin 66 and contacts a suitable retainer 230 carried by the lower end of pin 66 and the undersurface of tone arm actuator 226, to bias the actuator 226 upwardly. The front edge of tone arm actuator 226 is notched as at 232 to define a pair of spaced, enlarged lobes 234 and 236. The upper surface of actuator 226 is provided with a pair of upstanding bosses 238 which are adapted to be received in a pair of complementary recesses 240 formed in the undersurface of tone arm set-down cam 222, when actuator 226 is moved vertically upward relative to cam 222. As can be best seen in FIGS. 4, 8 and 10, the edge of set down cam 222 adjacent set-down lever 204 is provided with a plurality of stops 242, 244 and 246. Stop 242 is the closest to the pivot axis of the cam and corresponds to the correct positioning of the tone arm 48 when a twelve-inch record is being lowered (as sensed by the selector lever 158, which positions the arm 208 of the set-down lever 204 in position for engagement with cam 222). Stop 244 is spaced somewhat further from the pivot axis of the cam 22 and corresponds to a teninch record, while stop 246 is spaced still further from the pivot axis of the cam 222 and corresponds to a seven-inch record.

As can be best seen in FIG. 4, a post 248 extends downwardly from motor board 20 and is engageable with the rear surface of the tone arm set-down cam 222 to provide an ultimate of limit movement of cam 222 in a counterclockwise direction. As can be best seen in FIGS. 2 and 8, the lower end portion of post 248 is received in an arcuate slot 250 in an enlarged end portion 252 of rocker arm 136. A retractor lever 254 is pivotally mounted on post 248, and includes an upwardly extending end portion 256. An adjusting lever 260 is pivotally mounted to the lower surface of arm 208 of set-down lever 204 at 262, and is positioned for engagement by the upwardly extending portion 256 of retractor lever 254, as can be best seen in FIGS. 4 and 6. As can be best seen in FIG. 15, the leading edge 257 of retractor lever 254 is adapted to be engaged by the pin 154 of the rocker arm 136 at the end of the record change cycle, to pivot retractor lever 254 in a counterclockwise direction, as viewed from the bottom of the record changer, to move the end portion 256 of the lever 254 into engagement with the adjustable lever 260. Engagement of the retractor lever 254 with the adjustable lever 260 moves the set-down lever 204, and more particularly the right angularly disposed leg portion 218, into engagement with the lug 188 on the bottom of the selector cam 184 to pivot the selector lever 158 to an out-of-the-way position, such as that shown in FIG. 4.

Means are provided for adjusting the angular relationship between lever 260 and lever 204, and includes a downwardly extending tab 264 at one side of the lever 260. A corresponding downwardly extending tab 266 is provided on lever 204 and is aligned with tab 264. Tab 266 is provided with a threaded hole for reception of a screw 268 and tab 264 is provided with a clearance hole, so that the positions of levers 204 and 260 can be adjusted relative to one another. A spring 270 surrounds the shank of screw 268 and is biased between tabs 264 and 266 to provide a resilient connection therebetween.

Means are provided for elevating tone arm 48 prior to its movement toward and away from the turntable, and includes the aforementioned vertically movable tone arm actuating pin 66. As can be best seen in FIGS. 2, 7 and 9, an inclined arm 272 is provided at one side of the rocker arm 136 adjacent enlarged portion 252, and the lower end of pin 66 rests upon incline 272 when the tone arm 48 is in the play position shown in FIG. 7. During the portion of the record change cycle when it is necessary to move the tone arm 48 to an out-of-the-way position adjacent the side of the turntable, the rocker arm 136 moves to a position such as that shown in FIG. 9, where tone arm pin 66 has ridden up the incline 272 onto the upper surface of the rocker arm 136 so that the tone arm 48 is elevated.

As can be best seen in FIG. 4, the rearward end of trip mechanism actuator 124 is pivotally mounted to the tone arm set-down cam 222 at 274. Thus, as the tone arm 48 moves across the record during the playing of the same to pivot tone arm set-down cam 222, trip mechanism actuator 124 will be moved toward the right, as viewed in FIG. 4.

The means for pivoting ejector lever 78 to eject the lowermost record in the record stack includes a first push-off lever 276 pivotally mounted on a pin 284 which is spaced from but adjacent to bushing 42. A tab 278 is provided at one end of lever 276, and one end of a spring 280 is hooked thereover. As can be best seen in FIG. 2, the opposite end of spring 280 is hooked over a tab 282 which extends downwardly from the well 24 of motor board 20, so that counterclockwise movement of lever 276 about pin 284 is resisted by spring 280. An upraised cam portion 286 is provided on lever 276 on a side opposite from tab 278, and is engageable with a corresponding cam on a second push-off lever carried by drive gear 80, to be hereafter described. A spring 288 is connected between the front face of lever 276 and the lower portion 78*a* of ejector lever 78 to bias the ejector lever to a retracted position within the spindle, as can be best seen in FIG. 6.

A second push-off lever 290 is pivotally mounted on gear 80 by pivot pin 292. Lever 290 is firmly, yet yieldably, mounted on gear 80 by a wire spring 294 having a first end 296 hooked about pin 132, and a second end 300 (FIG. 6) bent upwardly to extend through a hole 298 in lever 290. Lever 290 includes an arcuate cam portion 302, and a cam portion 304 disposed at substantially right angles to cam portion 302, each of which are engageable with the cam portion 286 of lever 276 as gear 80 is rotated. From a comparison of FIGS. 8 and 10, it will be apparent that as lever 290 moves into engagement with lever 276, lever 276 is pivoted in a counterclockwise direction, and ejector lever 78 is pivoted to eject the lowermost record in the record stack. Spring 280 functions to pivot lever 276 back to its initial position after lever 290 moves out of engagement therewith.

Means are provided to slightly lift the ejector lever 78 during the record ejection operation and to positively hold the ejector lever in an "up" position after the same has been pivoted, to prevent the lowering of more than one record at the same time. To this end, a cam profile 279 is formed integrally with ejector lever 78 adjacent the lower end thereof. As can be best seen in FIG. 17 cam 279 is generally semi-circular in shape, and thus as lever 290 pivots lever 276, a surface 281 on lever 276 will move into engagement with the undersurface of cam 279 to lift ejector lever 78 as ejector lever 78 is being pivoted. In this manner, the upper portion of the ejector lever 78 will be moved into supporting engagement with the second lowermost record in the record stack while the lowermost record in the record stack is being ejected. Lever 276 provides a positive, stable lifting force to hold ejector lever 78 in an "up" position (as is indicated by the broken line showing of cam 279 at 279*a* in FIG. 17). As lever 290 moves out of engagement with lever 276, cam 279 will gradually slide along the surface 281 of the lever 276, so that the lowering of the record stack on to spindle shelf 76 will be controlled. Since the ejector lever 78 is actuated from the uniformly moving gear 80, the actuation of the ejector lever 78 is direct and the timing for ejection may be closely controlled.

A brief description of the operation of the aforedescribed elements is now believed to be in order. Assuming for the moment that the tone arm 48 and its associated stylus assembly 50 have just finished traversing the spiral groove of a record, and that additional records are supported on the spindle shelf 76 so that a last record condition does not exist, member 124 will actuate the trip mechanism to initiate the record change cycle in a manner hereinbefore described. The actuation of the mechanism when playing a first record in a record stack will hereinafter be explained. As gear 80 begins to rotate, and rocker arm 136 pivots in a counterclockwise direction from the position shown in FIGS. 2 and 4 toward the position shown in FIG. 8, pin 154 on rocker arm 136 will move generally downwardly, as viewed in FIGS. 2 and 8, and as pin 154 moves, spring 194 will bias selector lever 158 into a position facing toward the turntable, while spring 212 biases set-down lever 204 in counterclockwise direction about shaft 138. The movement of set-down lever 204 will cease when the upwardly extending portion 220 on leg 208 moves into engagement with the adjacent portion 247 on set-down cam 222. At this point the tab 188 on selector cam 184 is held in engagement with the end of arm 218 on leg 208 of set-down lever 204, and the selector lever 158 is positioned in the "in" position directed toward the turntable. It will be appreciated that as this first increment of movement of gear 80 takes place, tone arm actuating pin 66 will ride up the inclined portion 272 of the rocker arm 136, and thus the tone arm 48 will be elevated above the records on the turntable. However, the tone arm 48 will still be in a position adjacent the spindle at this point. As gear 80 continues to rotate toward the position shown in FIG. 8, rocker arm pin 154 will move downwardly into engagement with the lobe 236 on the tone arm actuator 226. Continued movement of gear 80 and rocker arm 136 causes pin 154 to pivot actuator 226 in a clockwise direction until bosses 238 snap into the recesses 240 on the set-down cam under the urging of spring 228. At this point, continued movement of rocker arm 136 will cause set-down cam 222 to pivot in a clockwise direction with actuator 226, and the tone arm 48 will begin its movement away from the position adjacent the spindle. After the next increment of movement, the spring 212 will bias the upwardly extending portion 220 of leg 208 into engagement with stop 246 as cam 222 rotates, which moves arm 218 away from tab 188 on selector cam 184. Spring 194 urges the tab 188 on cam 184 toward arm 218, however, since the last increment of movement of set-down lever 204 has moved the upwardly extending portion 216 on leg 206 into the path of travel of stop 198 on the selector cam 184, the selector cam will be positioned as shown in FIG. 8 with tab 188 spaced from the end of arm 218 and with the upwardly extending portion 216 on leg 206 engaging stop 198 to hold the cam 184 in the "in" or seven-inch record position. As gear 80 continues to rotate and rocker arm 136 continues to pivot in a counterclockwise direction, pin 154 will drive the actuator 226 and the set-down cam 222 until the tone arm 48 is in an "out" position disposed at the side of the turntable. FIGS. 8 and 9 illustrate the parts in this position, and it should be noted that at this point the rocker arm 136 has just about completed its counterclockwise pivoting movement. As the rocker arm 136 completes its counterclockwise pivoting movement, the enlarged portion of push-off lever 290 formed between cam surfaces 302 and 304 will move into engagement with the cam surface 286 on push-off lever 276 to effect the ejection of a record from the spindle, as can be best seen in FIG. 10. Assuming for purposes of example, that the lowermost record in the record stack is a twelve-inch record, as shown by the broken line in FIG. 10, the selector lever 158 will be rotated into the position shown in FIG. 10, by engagement with the record, and the upraised portion 216 on the end of leg 206 of set-down lever 204 will slide from stop 198 over stop 200 into engagement with stop 202. This will locate the upraised portion 220 on leg 208 of the set-down lever 204 in proper position for engagement with the corresponding stop 242 on set-down cam 222. Thus, as gear 80 continues to rotate and rocker arm 136 begins to pivot in a clockwise direction, rocker arm pin 154 will engage the lobe 234 on tone arm actuator 226 to pivot the tone arm actuator and the set-down cam 222 in a counterclockwise direction, as viewed in FIG. 10. This movement will, of course, move the tone arm 48 inwardly toward the turntable. However, the upraised portion of 220 on leg 208 of set-down lever 204 will engage the appropriate stop on cam 222, in this instance stop 242 for a twelve-inch record, and thus the tone arm 48 will be located in the proper position for engaging the outer edge of the record groove. Continued clockwise pivotal movement of rocker arm 136 will force bosses 238 out of engagement with recesses 240, and pin 154 will pivot actuator 226 in a counterclockwise direction relative to the cam 222 until the pin 154 engages the adjacent surface 257 of retractor lever 254. The upwardly extending portion 256 of retractor lever 254 will engage adjustable lever 260 to pivot set-down lever 204 in a clockwise direction as can be seen best in FIG. 15. At this point, the tone arm set-down pin 66 begins to ride down the inclined portion 272 of rocker arm 136 to lower the tone arm 48 for engagement with the record. Continued movement of set-down lever 204 in a clockwise direction shifts the end portion of arm 218 into engagement with the downwardly extending tab 188 on selector cam 184, to position the selector lever 158 in an out-of-the-way position, such as that shown in FIGS. 2 and 4, at the end of the record change cycle.

The above sequence of operation is repeated until each of the records in the stack upon the spindle have been played, at which point a last record shut-off mechanism is actuated to shut off the record changer. Before describing in detail the mechanism for automatically shutting off the record changer when no additional records remain on the spindle shelf 76, the means for initially starting the record changer will be first described.

Figures 11, 14:
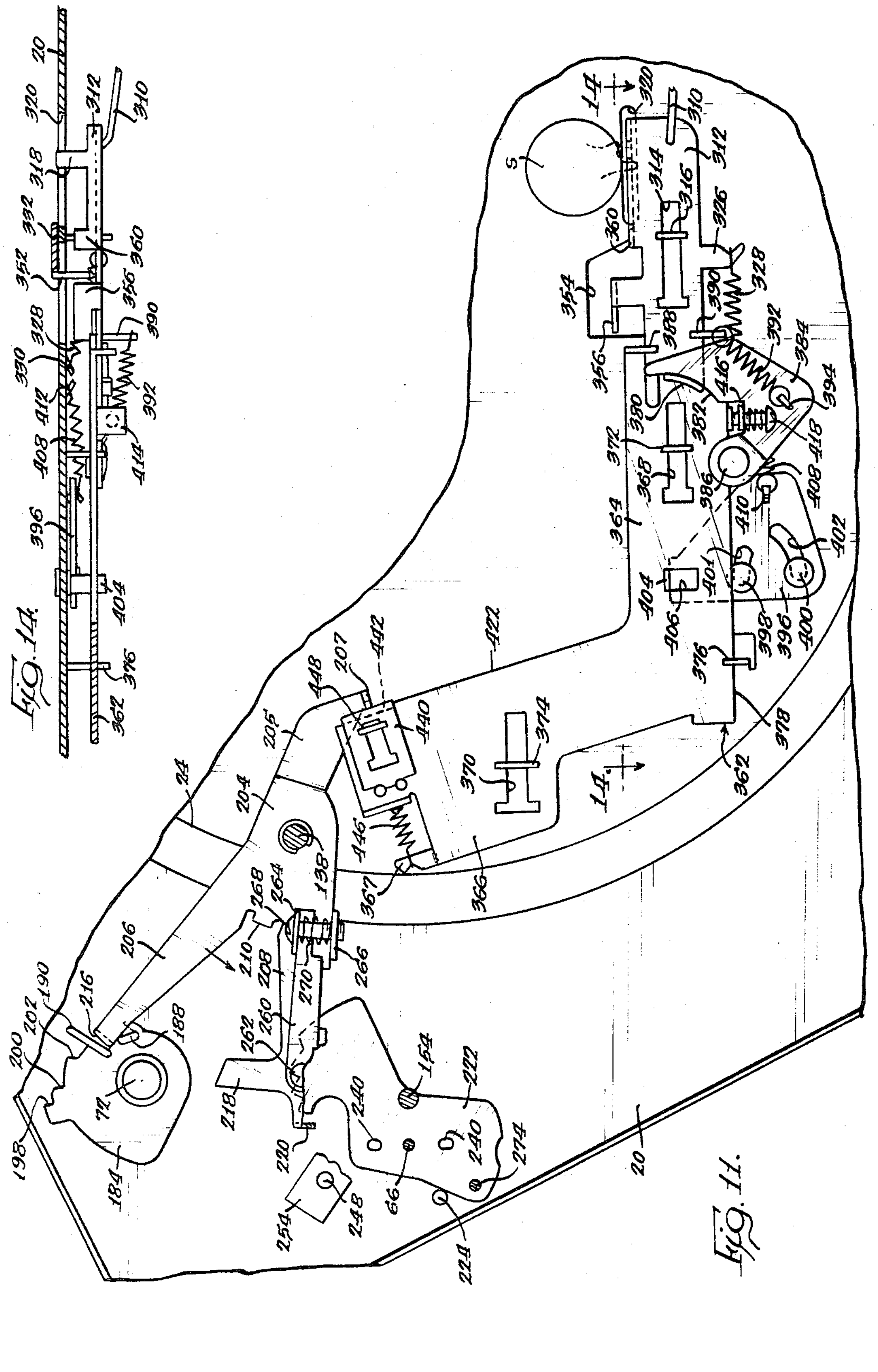
FIG. 11 is a fragmentary view similar to FIG. 10, illustrating the last record shut-off sensing means.
FIG. 14 is a sectional view taken generally along line 14—14 of FIG. 11.

As can be best seen in FIG. 1, a manually operable lever 35 is provided for initiating the operation of the record changer, and is movable between three positions, namely, "off," "on" and "reject." A wire link 310 is connected at one end to on-off lever 35, and at the other end to a switch shut-off lever 312. Shut-off lever 312 is provided with a longitudinal slot 314, which cooperates with a downwardly extending T-shaped tab 316 on the motor board 20 to guide the switch shut-off lever 312 for longitudinal movement relative to the motor board. An upwardly extending arm 318 is provided at the side of lever 312 and is movable in a longitudinal turntable slot 320 to engage the actuating members 322 and 324 of an on-off switch S. Switch S is a conventional on-off switch and is fixedly mounted on the motor board 20 with actuating members 322 and 324 being positioned under slot 320. Thus, when lever 35 is moved to the "on" position, lever 312 is moved to the right, as viewed in FIG. 2, and arm 318 engages switch actuator 324 to turn the switch on. When lever 312 moves to the left, as viewed in FIG. 2, at the end of the record changer operation, arm 318 engages actuator 322 to shut the switch S off. It will be understood, of course, that conventional spring means, not shown, are associated with switch actuators 322 and 324 to hold arm 318 and the lever 312 in the switch "on" position. A transverse arm 326 extends outwardly from one side of lever 312, and one end of a spring 328 is hooked thereover. The opposite end of spring 328 is hooked over a tab 330 (FIG. 14) which extends downwardly from motor board 20, and thus lever 312 is biased toward the left as viewed in FIG. 2, toward the switch "off" position. It will be understood, of course, that the spring means associated with switch actuators 322 and 324 is stronger than the spring 328, so that the lever 312 will be retained in the switch "on" position, when it is selected.

During periods when the record changer is not being used, it is desirable that idler 28 be moved out of engagement with the multi-diameter sleeve 32 fixed on output shaft of drive motor M. According to the present invention, means are associated with the switch shut-off lever 312 to move the idler 28 out of engagement with the sleeve 32 when the lever 312 is moved to the "off" position, and to move the idler 28 into engagement with the sleeve 32 when the lever 312 is moved to the "on" position. Accordingly, as can be best seen in FIG. 1, an idler retractor lever 332 is pivotally mounted on the upper surface of motor board 24, as at 334. A spring 336 is connected between a tab 338 on the motor board, and a tab 340 on the retractor lever 332, to bias the lever in a counterclockwise direction as viewed in FIG. 1. One end of retractor lever 332 is bent downwardly as at 342, and extends through an appropriate opening 344 in motor board 20, as can be best seen in FIG. 3. Pivotal movement of retractor lever 332 in a clockwise direction, as seen in FIG. 1, moves the end portion 342 of the retractor lever into engagement with an actuating arm 346 for controlling the linkage for moving the idler 28, which forms no part of the present invention. Movement of idler retractor lever 332 in a clockwise direction, as viewed in FIG. 1, is limited by a detent pin 348 which extends upwardly from the motor board, and which is engageable with a tab 350 provided on the end of the idler retractor lever remote from portion 342. The intermediate portion of retractor lever 332 includes a downwardly bent portion 352 which projects downwardly through an opening 354 in the motor board. As can be best seen in FIG. 14, an upwardly extending arm 356 is provided at the side of switch shut-off lever 312 and engages the downwardly extending portion 352 of the idler retractor lever 332 when the lever 312 is moved to the "on" position. The engagement of arm 356 with the downwardly bent portion 352 of the idler retractor lever pivots the idler retractor lever in a clockwise direction until the tab 350 thereof engages the stop 348. This movement is resisted by spring 336 which normally biases the idler 28 to a position out of engagement with the motor output shaft. However, the spring associated with the switch actuators 322 and 324 is stronger than spring 336, so that the tab 350 is held in position against stop 348. When shut-off lever 312 is moved to the left, as viewed in FIG. 14, toward the switch-off position, and outwardly extending arm 360 spaced from arm 356 engages the downwardly extending portion 352 of the idler retractor lever 332 to pivot the same in a counterclockwise direction as viewed in FIG. 1, whereupon spring 336 holds the idler 28 out of engagement with the motor output shaft. In a modified idler retractor construction contemplated by the present invention, the spring 336 is eliminated, and a generally V-shaped spring is connected between the post 348 and the adjacent end of the lever 332. The V-shaped spring normally urges the idler 28 to a position out of engagement with the motor output shaft, however, when the arm 356 on the lever 312 engages the portion 352 of the lever 332 to pivot the lever 332 and moves the idler 28 into engagement with the sleeve 32, the V-shaped spring moves over center to positively hold the idler 28 against the sleeve 32. When the lever 332 is pivoted in a counterclockwise direction (FIG. 1) by the engagement of arm 360 with the portion 352 of lever 332, the V-shaped spring will snap back over center to positively move the idler 28 out of engagement with the sleeve 32.

A main actuating member in the form of generally L-shaped reject lever 362 is mounted for reciprocal movement with respect to the motor board, and includes leg portions 364 366. Longitudinally extending, generally parallel slots 368 and 370 are provided in legs 364 and 366, respectively, and cooperate with downwardly extending generally T-shaped tabs 372 and 374 on the motor board to guide the reject lever in its reciprocal movement. An additional L-shaped tab 376 on the motor board 20 engages the face 378 of the leg 364 of the reject lever to assist in guiding the reject lever during its reciprocal movement.

As can be best seen in FIG. 2, the rearward end of switch shut-off lever 312 is provided with a downwardly extending arcuate cam portion 380. A similarly shaped arcuate cam surface 382 is provided on a reject lever pawl 384 which is pivotally mounted on the lower surface of the leg 364 at 386. Thus, when the shut-off lever 312 is moved from the "off" position to the "on" position, cam portion 380 is moved into a position of engagement with the arcuate surface 382 on the reject lever pawl 384. However, the relative position of lever 312 and pawl 384 is such that the movement of lever 312 to the "on" position does not move the cam 380 a sufficient distance to effect movement of pawl 384, and thus lever 362 is not moved. A pair of inwardly directed arms 388 and 390 are provided on the outer end of the leg 364 to guide the lever 312 in its movement relative to the lever 362.

When the lever 312 is moved from the "on" position to the "reject" position, the cam 380 is moved into engagement with the arcuate surface 382 on the reject lever pawl 384 in a manner so as to pivot the pawl 384 in a clockwise direction, as viewed from the bottom of the record changer, about pivot 386. A spring 392 is connected between arm 390 and a tab 394 on the pawl 384 to resist the tendency toward clockwise rotation of the pawl 384 when the cam 380 engages the arcuate surface 382. Spring 392 is of sufficient strength so that as the lever 312 is moved into the "reject" position, the lever 362 will be moved to the right, as viewed from the bottom of the record changer along with the lever 312. The spring 392 functions to provide a resilient link between the levers 312 and 362 and insure that the record changer will be shut off during a last record shut-off cycle, as will hereafter appear.

A generally triangularly shaped return lever 396 is pivotally mounted on the motor board adjacent its central portion on a pin 398. Lever 396 is provided with a first arcuate slot 401 which receives the shank of pin 398. A headed pin 400 on motor board 20 impales a second arcuate slot 402 in the return lever 396, and a downwardly extending arm 404 on the lever 396 is rockably received in a rectangular opening 406 in the reset lever 362. A spring 408 is connected between a tab 410 on the return lever 396 and a tab 412 (FIG. 14) on the motor board. When the parts are either in the "off" or in the "on" position, the longitudinal dimension of spring 408 is generally perpendicular to a line drawn through pins 398 and 400, and is spaced equally therebetween. Thus, when the switch on-off lever 312 is moved into the "reject" position, pin 398 will engage the left-hand end of slot 401, and the return lever will pivot in a clockwise direction about pin 398 to shift the alignment of the longitudinal dimension of spring 408 outwardly past pin 400. Accordingly, when lever 312 has moved the reject lever 362 to the right, as viewed from the bottom of the record changer, into the "reject" position, spring 408 will urge the arm 404 on the return lever 396 into engagement with the surrounding wall of the opening 406 in the reject lever 362 to urge the reject lever toward the left, as viewed from the bottom of the record changer, toward the "on"' or "neutral"' position. As will hereinafter apper in the description of the last record shut-off cycle, lever 396 also returns levers 362 and 312 to the "neutral" position after the last record has been played.

Means are provided for locating reject lever pawl 384 in the proper "on" position when the reject lever 362 returns to the "on" position and includes a downwardly extending arm 414 at the side of leg 364. A downwardly extending leg 416 is provided on pawl 384, and is provided with a threaded hole through which a screw 418 extends. The end of screw 418 is adapted to abut against arm 414 when the levers are in th "on" position, and thus the arcuate surface 382 on the pawl 384 will be properly positioned for engagement with the arcuate cam 380 on the lever 312 when the lever 312 is moved toward the "reject" position. A spring 420 is provided to permit a force between the head of screw 418 and leg 416 so that screw 418 is adjustably fixed in the proper position. Screw 418 also provides a positive means for shutting off of the record changer during the last record shut-off cycle as will hereinafter be explained.

Accordingly, when it is desired to reject a record which is playing on the changer, or to initiate the playing of the first record in a stack of records, the manually operable on-off lever 35 is moved to the "reject" position which shifts levers 312 and 362 to the right, as viewed from the bottom of the turntable. The leading edge 422 of the leg 366 of the reject lever is positioned for engagement with the downwardly extending portion 96 of the trip mechanism actuator 94 to initiate a record change cycle and eject the lowermost record from the record stack. It will be understood, of course, that it is desirable to select the appropriate turntable speed prior to the actuation of the lever 35. Conventional speed selection means are associated with the speed selection lever 34, and includes a wire link 424. The wire link 424 is connected to a detent plate 426 which is provided with a plurality of upwardly facing notches 428, each corresponding to a selected turntable speed. A detent arm 430 carries a detent member 432 which is engageable with the notches 428 upon movement of the detent plate 426. Detent arm 430 is connected to the mechanism for shifting idler wheel 30 into engagement with the appropriate step on sleeve 32 to control the rotational speed of idler 28 and thus the rotational speed of the turntable.

The operation of the aforedescribed record playing mechanism will be substantially the same for the first record to be played as that described above in connection with the playing of intermediate records in a record stack. However, when the record change cycle is initiated by manual actuation of the reject lever 362, the tone arm will be in an "out" position adjacent the side of the turntable, so that when rocker arm 136 begins its initial counterclockwise movement from the position shown in FIGS. 2 and 4 toward the position shown in FIG. 8, the surface 247 on set-down cam 222 will be out of the line of travel of upwardly extending portion 220 on leg 208 of set-down lever 204, and the movement of set-down lever 204 will stop when the upwardly extending portion 216 on leg 206 of set-down lever 204 engages the stop 198 on selector cam 184 to properly locate the selector lever 158 in the "in" or seven-inch record position.

Assuming now that each of the records in the record stack have been played, and that a last record shut-off condition exists, means are provided for automatically shutting off the record changer upon the sensing of this condition. As can be best seen in FIGS. 7, 9 and 12, the rearward end of pressure arm 70 is provided with a hub 71 which is received on pressure arm shaft 72. An axially extending blade 73 projects radially outwardly from hub 71, and is adapted to drop downwardly into the groove formed between upwardly extending lugs 174 and 176, and the slot 165 in flange 163, when the last record has been ejected from the spindle shelf 76. Thus, as can be best seen in FIGS. 12 and 13, after the last record has been ejected from the spindle, the selector lever 158 is locked against movement relative to upright 166. Accordingly, after the cartridge and stylus assembly 50 of the tone arm 48 has tracked across the spiral groove of the record to be played, and the actuating member 124 has engaged the trip mechanism to rotate gear 80, the end portion 216 of the leg 206 on the set-down lever 204 will move into engagement with the portion of the selector cam 184 adjacent radial arm 190 (FIG. 11), as the set-down lever 204 pivots in a counterclockwise direction about shaft 138. The movement of the set-down lever 204 into the position shown in FIG. 11 positions a downwardly extending finger 207 on the rearwardly extending arm portion 205 of the set-down lever 204 in engagement with the upwardly extending flange 442 on a shut-off pawl 440. As can be best seen in FIGS. 6 and 16, finger 207 is generally triangular in shape, and includes an inclined edge 209, and a generally vertical edge 211. A generally T-shaped tab 448 extends downwardly from the leg 366 of reject lever 362, and allows the shut-off pawl 440 to pivot downwardly with respect to the leg 366. Thus, as lever 204 pivots into the position shown in FIG. 11, the inclined edge 209 will slide over the upstanding flange 442 and pivot the pawl 440 downwardly. A spring 446 is connected between a tab 367 on reject lever 362 and an upwardly extending tab 444 on the shut-off pawl 440 to return the shut-off pawl 440 to the position shown in FIG. 16, after the finger 207 has been moved behind the flange 442 and the upwardly extending portion 216 of finger 206 has been positioned against the cam 184. As gear 80 continues to rotate and the record change cycle progresses, lever 204 will begin to pivot in a clockwise direction and the generally vertical surface 211 on finger 207 will slide along flange 442 and pull reject lever 362 to the left as viewed from the bottom of the record changer. It will be understood, of course, that movement of lever 362 to the left will also move lever 312 to the left by engagement of pawl 384 with cam 380 on lever 312, and switch actuator 322 will be engaged to shut off the switch S. The end of screw 418 will engage arm 414 on lever 362 to provide means for resisting pivoting movement of pawl 384 so that the lever 312 will be positively actuated. If the record changer is inadvertently manually shut off during the last record shut-off cycle, when finger 207 is still behind flange 442, spring 392 allows the changer to be turned back on by resiliently mounting pawl 384 so that it can pivot relative to lever 362 when lever 312 is moved to the "on" position. As lever 204 continues to pivot, finger 207 will slide off the end of flange 442 to free lever 362 for movement to a neutral position. As lever 362 moves to the left the shank of pin 400 bears against the left-hand end of slot 402, and return lever 396 pivots in a counterclockwise direction, as viewed from the bottom of the record changer, about pin 400 to shift the alignment of the longitudinal dimension of spring 408 outwardly past pin 398. Thus, spring 408 will return levers 312 and 362 to a neutral position at the end of the last record shut-off cycle. The record change cycle will be completed due to the action of spring 144 and the momentum of the turntable.

As the record change cycle is completed, the rocker arm pin 154 drives the tone arm 48 to an out-of-the-way position adjacent the side of the turntable (FIG. 1) by engagement with the actuator 226 and its clutching engagement with set-down cam 222. As the rocker arm 136 completes its clockwise pivotal movement, as viewed from the bottom of the record changer, tone arm pin 66 moves down the inclined portion 272 of rocker arm 136 to gently lower the tone arm onto a suitable rest provided on the motor board.

We claim:

1. In a record changer, a tone arm having a plurality of set-down positions dependent upon the size of a record to be played, a set-down cam operatively connected to the tone arm and having a plurality of cam surfaces, a record size sensing mechanism including a size sensing member positionable to be engaged by a record of a relatively large diameter, a selector cam connected to said size sensing member, a bifurcated lever mounted for pivotal movement with one leg thereof positioned by said selector cam and the other leg thereby positioned to be engaged by one of said cam surfaces, means for positively moving said lever to an initial position, and yieldable means interconnecting one of said legs to said selector cam for positioning said size sensing member in a position to be engaged by a record.

2. In a record changer for playing a stack of records, a tone arm having a plurality of set-down positions dependent upon the size of a record to be played, a set-down cam operatively connected to the tone arm and having a plurality of cam surfaces, a record size sensing mechanism including a movable member positionable to be engaged by a record of a relatively large diameter, a selector cam connected to said movable member, a pivotally mounted lever having a bifurcated first end defined by spaced legs and a second end, one leg of said bifurcated end positioned by said selector cam and the other leg of said bifurcated end positioned thereby to be engaged by one of said cam surfaces, means for positively moving said lever to an initial position, yieldable means interconnecting one of said legs to said selector cam for positioning said movable member in a position to be engaged by a record, means for shutting off the record changer when the last record in the record stack has been played, and means operated by said lever second end for actuating said last record shut off means.

3. In a record changer having a motorboard, a tone arm movable relative to the motorboard and a cyclically operable member movable along a path in each cycle, means for moving the tone arm to a clearance position in each cycle after playing of a record comprising, a bifurcated dog having a pair for spaced legs, said dog being pivoted coaxially with an axis of rotation of the tone arm for rotation relative to said tone arm, means operable by said member for frictionally clutching the dog to the tone arm, and means on the member alternately engageable with different legs of the dog for successively moving the tone arm outwardly and then inwardly to a set-down position.

4. In an automatic record changer for sequentially playing each of the records in a record stack, a motorboard rotatably mounting a turntable, means for supporting a stack of records above said turntable, means for effecting a record change cycle, a tone arm movable between a clearance position and a plurality of set-down positions dependent upon the size of a record to be played, a pressure arm adapted to rest upon the record stack and to sense when the last record in the record stack has been ejected therefrom, a record size sensing mechanism including a flag member positionable to be engaged by a record of a relatively large diameter, means urging said flag toward a position to be engaged by a record, means for shutting off the record changer when the last record in the record stack has been played, and lock out means responsive to the sensing of the ejection of the last record in the record stack by said pressure arm for holding said flag out of its record engaging position and actuating said last record shut off means.

5. In a record changer as defined in claim 4 wherein said flag is provided with a notch, and said pressure arm includes an abutment movable into said notch when the last record in the record stack is ejected therefrom to prevent said flag from moving into its record engaging position.

6. In a record changer as defined in claim 5 in which a fixed housing is provided with a notch, and wherein the notch on said flag is movable into alignment with the notch in said housing so that the abutment on said pressure arm can be positioned in said notches to prevent said flag from moving relative to said housing.

7. In an automatic record changer for sequentially playing each of the records in a record stack, a motorboard rotatably mounting a turntable, means for supporting a stack of records above said turntable, means for effecting a record change cycle, a tone arm movable between a clearance position and a plurality of set-down positions dependent upon the size of a record to be played, a record size sensing mechanism including a member movable between record engaging positions and a record clearance position, means urging said movable member toward a record engaging position, means for sensing when the last record in the record stack has been ejected therefrom, means for shutting off the record changer when the last record in the record stack has been played, and means responsive to the sensing of the ejection of the last record in the record stack by said sensing means for holding said movable member in its record clearance position for actuating said last record shut off means.

8. A record changer as defined in claim 7 wherein said means for sensing the ejection of the last record in a record stack includes a pressure arm adapted to rest on the record stack and having lock out means for holding the movable member in its record clearance position.

9. A record changer as set forth in claim 8 wherein said lock out means includes a first notch in said movable member and an abutment associated with said pressure arm and movable into said first notch in the absence of a record in the record stack to retain said movable member in its record clearance position.

10. A record changer as set forth in claim 9 in which a housing is mounted on said motorboard with said housing including a second notch, said housing having a first bearing surface supporting a first portion of said movable member, and wherein said first notch is movable into alignment with said second notch so that said abutment can be positioned in both said notches to prevent said member from moving relative to said housing.

11. A record changer as set forth in claim 10 in which said housing includes a second bearing surface spaced from said first bearing surface and supporting a second portion of said movable member, said movable member being formed of somewhat resilient material whereby said said first and second member portions can be moved relative to one another for easy assembly of said member onto said housing.

12. A record changer as set forth in claim 7 including a record spindle for supporting said record stack, a record ejector lever mounted on said spindle and extending to a level beneath the spindle and movable pivotally relative to the spindle to eject a record from the record stack, and said record ejector lever also being movable vertically relative to the spindle, and an actuating member arranged to be positively driven relative to the motorboard during a record change cycle, said ejector lever having an arcuate surface engageable by said member to displace said ejector lever vertically upwards relative to the spindle in a controlled manner during operation thereof.

13. In an automatic record changer for sequentially playing each of the records in a record stack, a motorboard rotatably mounting a turntable, means for supporting a stack of records above said turntable, means for effecting a record change cycle, a tone arm having means for tracking a record rotating with the turntable, means for ejecting the lowermost record in the record stack during said record change cycle, means responsive to said cycle effecting means for shifting said tone arm to a clearance position at the side of said turntable so that an ejected record can move to the turntable, means for sensing the ejection of the last record in the record stack, a main actuating member movable rectilinearly in a plane generally parallel to the motorboard, a lever pivotally mounted on said motorboard for movement in a plane paralel to the motorboard, an abutment on said lever, means for shutting off the record changer during a record change cycle after the last record in the record stack has been played, means for moving said main actuating member in a first direction to operate said cycle effecting means and said record ejecting means, and means responsive to said sensing means for pivoting said lever to move said abutment into engagement with said main actuating member to move the same in a second direction for operating said last record shut off means.

14. In an automatic record changer for sequentially playing each of the records in a record stack, a motorboard rotatably mounting a turntable, means for supporting a stack of records above said turntable, means for effecting a record change cycle, a tone arm having means for tracking a record rotating with the turntable, means for ejecting the lowermost record in the record stack during a record change cycle, means responsive to said cycle effecting means for shifting said tone arm to a clearance position at the side of said turntable so that an ejected record can move to the turntable, a main actuating member movable in a plane generally parallel to the motorboard, an abuttable member resiliently mounted on said main actuating member for movement in a direction generally transverse to the plane of movement of said main actuating member, a lever pivotally mounted on said motorboard for movement in a plane parallel to the motorboard, an abutment on said lever, said lever abutment including a camming surface for moving said abuttable member to allow said abutment to move into position for engaging said main actuating member, means for shutting off the record changer when the last record in the record stack has been played, means for moving said main actuating member in a first direction to operate said record ejecting means, and means for moving said lever abutment into engagement with the abuttable member of said main actuating member to move the main actuating member in a second direction for operating said last record shut off means.

15. In an automatic record changer for sequentially playing each of the records in a record stack; a motorboard rotatably mounting a turntable; means for supporting a stack of records above said turntable; means for effecting a record change cycle; a tone arm having means for tracking a record rotating with the turntable; means responsive to said cycle effecting means for shifting said tone arm to a clearance position at the side of said turntable so that an ejected record can move to the turntable; means for ejecting the lowermost record in the record stack during a record change cycle; means for shutting off the record changer when the last record in the record stack has been played; a main actuating member movable relative to the motorboard between a neutral position, a record reject position, and a last record shut off position; means for moving said main actuating member into said record reject position to operate said record ejecting means; means for moving said main actuating member into said last record shut off position for operating said last record shut off means; and means for returning said main actuating member to said neutral position including a lever pivotally mounted at spaced positions on said motorboard, said lever having an abutment engaging said main actuating member for movement thereof, and resilient means connected to said lever for urging said main actuating member to said neutral position.

16. In a record changer as defined in claim 15 wherein said lever is provided with a pair of arcuate slots, and pivot members are provided at said spaced positions, each of said pivot members being received in one of said arcuate slots.

17. A record changer as set forth in claim 15 wherein said main actuating member includes an opening, and wherein said lever abutment impales said opening.

18. In an automatic record changer for sequentially playing each of the records in a record stack; a motorboard rotatably mounting a turntable; means for supporting a stack of records above said turntable; means for effecting a record change cycle; a tone arm having a plurality of set-down positions dependent upon the size of a record to be played; means on said tone arm for tracking a record rotating with the turntable; a set-down cam operatively connected to the tone arm and having a plurality of cam surfaces; a record size sensing mechanism including a size sensing member positionable to be engaged by a record of a relatively large diameter; a selector cam connected to said size sensing member; a bifurcated lever mounted for pivotal movement with one leg thereof positioned by said selector cam and the other leg thereby positioned to be engaged by one of said cam surfaces; means for positively moving said lever to an initial position; yieldable means interconnecting one of said legs to said selector cam for positioning said size sensing member in a position to be engaged by a record; means responsive to said cycle effecting means for shifting said tone arm to a clearance position at the side of said turntable so that an ejected record can move to the turntable; means for ejecting the lowermost record in the record stack during a record change cycle; means for shutting off the record changer when the last record in the record stack has been played; a main actuating member movable relative to the motorboard between a neutral position, a record reject position, and a last record shut off position; means for moving said main actuating member into said record reject position to operate said record ejecting means; means for moving said main actuating member into said last record shut off position for operating said last record shut off means; and means for returning said main actuating member to said neutral position including a lever pivotally mounted at spaced positions on said motorboard, said lever having an abutment engaging said main actuating member for movement thereof, and resilient means connected to said lever for urging said main actuating member to said neutral position.

19. In an automatic record changer for sequentially playing each of the records in a record stack, a motorboard rotatably mounting a turntable, means for supporting a stack of records above said turntable, means for effecting a record change cycle, a tone arm having a plurality of set-down positions dependent upon the size of a record to be played, means on said tone arm for tracking a record rotating with the turntable, a set-down cam operatively connected to the tone arm and having a plurality of cam surfaces, a record size sensing mechanism including a size sensing member positionable to be engaged by a record of a relatively large diameter, a selector cam connected to said size sensing member, means for ejecting the lowermost record in the record stack during said record change cycle, means responsive to said cycle effecting means for shifting said tone arm to a clearance position at the side of said turntable so that an ejected record can move to the turntable, means for sensing the ejection of the last record in the record stack, a main actuating member movable rectilinearly in a plane generally parallel to the motorboard, a bifurcated lever pivotally mounted on said motorboard for movement in a plane parallel to the motorboard, said lever having one leg thereof positioned by said selector cam and the other leg thereby positioned to be engaged by one of said cam surfaces, means for positively moving said lever to an initial position, yieldable means interconnecting one of said legs to said selector cam for positioning said size sensing member in a position to be engaged by a record, an abutment on said lever, means for shutting off the record changer during a record change cycle after the last record in the record stack has been played, means for moving said main actuating member in a first direction to operate said cycle effecting means and said record ejecting means, and means responsive to said sensing means for pivoting said lever to move said abutment into engagement with said main actuating member to move the same in a second direction for operating said last record shut off means.

20. In an automatic record changer for sequentially playing each of the records in a record stack, a motorboard rotatably mounting a turntable, means for supporting a stack of records above said turntable, means for effecting a record change cycle, a tone arm having a plurality of set-down positions dependent upon the size of a record to be played, means on said tone arm for tracking a record rotating with the turntable, means for ejecting the lowermost record in the record stack during a record change cycle, means responsive to said cycle effecting means for shifting said tone arm to a clearance position at the side of said turntable so that an ejected record can move to the turntable, a set-down cam operatively connected to the tone arm and having a plurality of cam surfaces, a record size sensing mechanism including a size sensing member positionable to be engaged by a record of a relatively large diameter, a selector cam connected to said size sensing member, a bifurcated lever pivotally mounted on said motorboard for movement in a plane parallel with the motorboard, one leg of said lever being positioned by said selector cam and the other leg of said lever being thereby positioned to be engaged by one of said cam surfaces, means for positively moving said lever to an initial position, yieldable means interconnecting one of said legs to said selector cam for positioning said size sensing member in a position to be engaged by a record, a main actuating member movable in a plane generally parallel to the motorboard, an abutable member resiliently mounted on said main actuating member for movement in a direction generally transverse to the plane of movement of said main actuating member, an abutment on said lever, said lever abutment including a camming surface for moving said abutable member to allow said abutment to move into a position for engaging said main actuating member, means for shutting off the record changer when the last record in the record stack has been played, means for moving said main actuating member in a first direction to operate said record ejecting means, and means for moving said lever abutment into engagement with the abuttable member of said main actuating member to move the main actuating member in a second direction for operating said last record shut off means.

21. In an automatic record changer for sequentially playing each of the records in a record stack; a motorboard rotatably mounting a turntable; means for supporting a stack of records above said turntable; means for effecting a record change cycle, a tone arm having means for tracking a record rotating with the turntable; a member movable along a path in each cycle; means for moving the tone arm to a clearance position in each cycle after playing of a record comprising, a bifurcated dog pivoted coaxially with an axis of rotation of the tone arm, means operable by said member for frictionally clutching the dog to the tone arm, and means on the member engageable with the dog for successively moving the tone arm outwardly and then inwardly to a set-down position; means for ejecting the lowermost record in the record stack during a record change cycle; means for shutting off the record changer when the last record in the record stack has been played; a main actuating member movable relative to the motorboard between a neutral position, a record reject position, and a last record shut off position; means for moving said main actuating member into said record reject position to operate said record ejecting means; means for moving said main actuating member into said last record shut off position for operating said last record shut off means; and means for returning said main actuating member to said neutral position including a lever pivotally mounted at spaced positions on said motorboard, said lever having an abutment engaging said main actuating member for movement thereof, and resilient means connected to said lever for urging said main actuating member to said neutral position.

22. In an automatic record changer for sequentially playing each of the records in a record stack; a motorboard rotatably mounting a turntable; means for supporting a stack of records above said turntable; means for effecting a record change cycle, a tone arm having means for tracking a record rotating with the turntable, means for ejecting the lowermost record in the record stack during said record change cycle, a member movable along a path in each cycle, means for moving the tone arm to a clearance position in each cycle after playing of a record comprising, a bifurcated dog pivoted coaxially with an axis of rotation of the tone arm, means operable by said member for frictionally clutching the dog to the tone arm, and means on the member engageable with the dog for successively moving the tone arm outwardly and then inwardly to a set-down postion; means for sensing the ejection of the last record in the record stack; a main actuating member movable rectilinearly in a plane generally parallel to the motorboard; a lever pivotally mounted on said motorboard for movement in a plane parallel to the motorboard; an abutment on said lever; means for shutting off the record changer during a record change cycle after the last record in the record stack has been played; means for moving said main actuating member in a first direction to operate said cycle effecting means and said record ejecting means; and means responsive to said sensing means for pivoting said lever to move said abutment into engagement with said main actuating member to move the same in a second direction for operating said last record shut off means.

23. In an automatic record changer for sequentially playing each of the records in a record stack; a motorboard rotatably mounting a turntable; means for supporting a stack of records above said turntable; means for effecting a record change cycle, a tone arm having means for tracking a record rotating with the turntable, means means for ejecting the lowermost record in the record stack during a record change cycle; a member movable along a path in each cycle; means for moving the tone arm to a clearance position in each cycle after playing of a record comprising, a bifurcated dog pivoted coaxially with an axis of rotation of the tone arm, means operable by said member for frictionally clutching the dog to the tone arm, and means on the member engageable with the dog for successively moving the tone arm outwardly and then inwardly to a set-down position; a main actuating member movable in a plane generally parallel to the motor board; an abuttable member resiliently mounted on said main actuating member for movement in a direction generally transverse to the plane of movement of said main actuating member; a lever pivotally mounted on said motorboard for movement in a plane parallel to the motorboard; an abutment on said lever, said lever abutment including a camming surface for moving said abuttable member to allow said abutment to move into a position for engaging said main actuating member; means for shutting off the record changer when the last record in the record stack has been played; means for moving said main actuating member in a first direction to operate said record ejecting means; and means for moving said lever abutment into engagement with the abuttable member of said main actuating member to move the main actuating member in a second direction for operating said last record shut off means.

24. In an automatic record changer for sequentially playing each of the records in a record stack; a motorboard rotatably mounting a turntable; means for supporting a stack of records above said turntable; means for effecting a record change cycle; a tone arm having means for tracking a record rotating with the turntable, said tone arm being movable between a clearance position at the side of said turntable and a plurality of set-down positions dependent upon the size of a record to be played; means responsive to said cycle effecting means for shifting said tone arm to said clearance position so that an ejected record can move to the turntable; means for ejecting the lowermost record in the record stack during a record change cycle; a record size sensing mechanism including a member movable between record engaging positions and a record clearance position; means urging said movable member toward a record engaging position; means for sensing when the last record in the record stack has been ejected therefrom; means for shutting off the record changer when the last record in the record stack has been played; a main actuating member movable relative to the motorboard between a neutral position, a record reject position, and a last record shut off position; means for moving said main actuating member into said record reject position to operate said record ejecting means; means responsive to the sensing of the ejection of the last record in the record stack by said sensing means for holding said movable member in its record clearance position; means responsive to the holding of said movable member in its record clearance position for moving said main actuating member into said last record shut off position for operating said last record shut off means; and means for returning said main actuating member to said neutral position including a lever pivotally mounted at spaced positions on said motorboard, said lever having an abutment engaging said main actuating member for movement thereof, and resilient means connected to said lever for urging said main actuating member to said neutral position.

25. In an automatic record changer for sequentially playing each of the records in a record stack, a motorboard rotatably mounting a turntable, means for supporting a stack of records above said turntable, means for effecting a record change cycle, a tone arm having means for tracking a record rotating with the turntable, a set-down cam operatively connected to the tone arm and having a plurality of cam surfaces, a record size sensing mechanism including a size sensing member positionable to be engaged by a record of a relatively large diameter, a selector cam connected to said size sensing member, means for ejecting the lowermost record in the record stack during said record change cycle, means responsive to said cycle effecting means for shifting said tone arm to said clearance position so that an ejected record can move to the turntable, a record size sensing mechanism including a member movable between record engaging positions and a record clearance position, means urging said movable member toward a record engaging position, means for sensing the ejection of the last record in the record stack, a main actuating member movable rectilinearly in a plane generally parallel to the motorboard, a lever pivotally mounted on said motoboard for movement in a plane parallel to the motorboard, an abutment on said lever, means for shutting off the record changer during a record change cycle after the last record in the record stack has been played, means for moving said main actuating member in a first direction to operate said cycle effecting means and said record ejecting means, means responsive to the sensing of the ejection of the last record in the record stack by said sensing means for holding said movable member in its record clearance position, and means responsive to the holding of said movable member in its record clearance position for pivoting said lever to move said abutment into engagement with said main actuating member to move the same in a second direction for operating said last record shut off means.

26. In an automatic record changer for sequentially playing each of the records in a record stack, a motorboard rotatably mounting a turntable, means for supporting a stack of records above said turntable, means for effecting a record change cycle, a tone arm having means for tracking a record rotating with the turntable, a set-down cam operatively connected to the tone arm and having a plurality of cam surfaces, a record size sensing mechanism including a size sensing member positionable to be engaged by a record of a relatively large diameter, a selector cam connected to said size sensing member, a bifurcated lever pivotally mounted on said motorboard for movement in a plane parallel with the motorboard, one leg of said lever being thereby positioned by said selector cam and the other leg being positioned to be engaged by one of said cam surfaces, means for positively moving said lever to an initial position, yieldable means interconnecting one of said legs to said selector cam for positioning said size sensing member in a position to be engaged by a record, means for ejecting the lowermost record in the record stack during a record change cycle, means responsive to said cycle effecting means for shifting said tone arm to said clearance position so that an ejected record can move to the turntable, a record size sensing mechanism including a member movable between record engaging positions and a record clearance position, means urging said movable member toward a record engaging position, means for sensing when the last record in the record stack has been ejected therefrom, a main actuating member movable in a plane generally parallel to the motorboard, an abuttable member resiliently mounted on said main actuating member for movement in a direction generally transverse to the plane of movement of said main actuating member, a lever pivotally mounted on said motorboard for movement in a plane parallel to the motorboard, an abutment on said lever, said lever abutment including a camming surface for moving said abuttable member to allow said abutment to move into a position for engaging said main actuating member, means for shutting off the record changer when the last record in the record stack has been played, means for moving said main actuating member in a first direction to operate said record ejecting means, means responsive to the sensing of the ejection of the last record in the record stack by said sensing means for holding said movable member in its record clearance position, and means responsive to the holding of said movable member in its record clearance position for moving said lever abutment into engagement with the abuttable member of said main actuating member to move the main actuating member in a second direction for operating said last record shut off means.

27. In an automatic record changer for sequentially playing each of the records in a record stack, a motorboard rotatably mounting a turntable, means for supporting a stack of records above said turntable, means for effecting a record change cycle, a tone arm having means for tracking a record rotating with the turntable, said tone arm being movable between a clearance position and a plurality of set-down positions dependent upon the size of a record to be played, means responsive to said cycle means for shifting said tone arm to said clearance position so that an ejected record can move to the turntable, a set-down cam operatively connected to the tone arm and having a plurality of cam surfaces, size sensing mechanism including a member movable between record engaging positions and a record clearance position, a selector cam connected to said size sensing member, a bifurcated lever mounted for pivotal movement with one leg thereof positioned by said selector cam and the other leg thereby positioned to be engaged by one of said cam surfaces, means for positively moving said lever to an initial position, yieldable means interconnecting one of said legs to said selector cam for positioning said size sensing member in a position to be engaged by a record, means for sensing when the last record in the record stack has been ejected therefrom, means for shutting off the record changer when the last record in the record stack has been played, and means responsive to the sensing of the ejection of the last record in the record stack by said sensing means for holding said size sensing member in its record clearance position for actuating said last record shut off menns.

28. In an automatic record changer for sequentially playing each of the records in a record stack, a motorboard rotatably mounting a turntable, means for supporting a stack of records above said turntable, means for effecting a record change cycle including a member movable along a path in each cycle, a tone arm having means for tracking a record rotating with the turntable, said tone arm being movable between a clearance position and a plurality of set-down positions dependent upon the size of a record to be played, means responsive to said cycle means for shifting said tone arm to said clearance position so that an ejected record can move to the turntable, said last named means including a bifurcated dog pivoted coaxially with an axis of rotation of the tone arm, means operable by said member for frictionally clutching the dog to the tone arm, means on the member engageable with the dog for successively moving the tone arm outwardly and then inwardly to a set-down position, size sensing mechanism including a member movable between record engaging positions and a record clearance position, means urging said movable member t ward a record engaging position, means for sensing when the last record in the record stack has been ejected therefrom, means for shutting off the record changer when the last record in the record stack has been played, and means responsive to the sensing of the ejection of the last record in the record stack by said sensing means for holding said movable member in its record clearance position for actuating said last record shut off means.

29. In an automatic record changer for sequentially playing each of the records in a record stack; a motorboard rotatably mounting a turntable; means for supporting a stack of records above said turntable; means for effecting a record change cycle; a tone arm having means for tracking a record rotating with the turntable; means responsive to said cycle effecting means for shifting said tone arm to a clearance position at the side of said turntable so that an ejected record can move to the turntable; means for ejecting the lowermost record in the record stack during a record change cycle; means for shutting off the record changer when the last record in the record stack has been played, said last named means including a switch and lever for actuating said switch; a main actuating member movable relative to the motor-board between a neutral position, a record reject position, and a last record shut off position; means for moving said main actuating member into said record reject position to operate said record ejecting means, said moving means including said switch actuating lever and a connecting member carried by said main actuating member and having a portion positioned to be engaged by a portion of said switch actuating lever for movement of said main actuating member into said record reject position; means for moving said main actuating member into said last record shut off position for operating said last record shut off means by shifting said switch actuating lever to actuate said switch; and means for returning said main actuating member to said neutral position.

30. A record changer as set forth in claim 29 in which said connecting member is a pawl pivotally mounted on said main actuating member, and wherein resilient means is connected between said main actuating member and said pawl to provide yieldable means for resisting pivotal movement of said pawl by said switch actuating lever.

31. A record changer as set forth in claim 29 wherein said switch actuating lever portion includes an arcuate cam, and said connecting member portion is an arcuate cam surface.

32. A record changer as set forth in claim 31 wherein means is provided for adjusting the position of said cam surface relative to said cam.

References Cited

UNITED STATES PATENTS

| | | | |
|---|---|---|---|
| 2,637,558 | 5/1953 | Fisher | 274—10 |
| 2,794,647 | 6/1957 | Guest | 274—10 |
| 2,738,193 | 3/1956 | Rae | 274—10 |
| 2,989,312 | 6/1961 | Vistain | 274—10 |
| 2,578,378 | 12/1951 | Stolberg | 274—10 |
| 3,197,212 | 7/1965 | De Weese | 274—10 |
| 3,240,498 | 3/1966 | Grossenheinder et al. | 274—10 |
| 3,279,798 | 10/1966 | Freathy et al. | 274—10 |

HARRY N. HAROIAN, *Primary Examiner.*